US011972683B2

(12) United States Patent
Füreder et al.

(10) Patent No.: US 11,972,683 B2
(45) Date of Patent: Apr. 30, 2024

(54) METHOD, DEVICE AND ARRANGEMENT FOR TRACKING MOVING OBJECTS

(71) Applicant: YUNEX GMBH, Munich (DE)

(72) Inventors: Herbert Füreder, Vienna (AT); Fritz Kasslatter, Gablitz (AT)

(73) Assignee: Yunex GMBH, Munich (DE)

( * ) Notice: Subject to any disclaimer, the term of this patent is extended or adjusted under 35 U.S.C. 154(b) by 1526 days.

(21) Appl. No.: 16/304,367

(22) PCT Filed: May 25, 2016

(86) PCT No.: PCT/EP2016/061793
§ 371 (c)(1),
(2) Date: Jun. 26, 2019

(87) PCT Pub. No.: WO2017/202461
PCT Pub. Date: Nov. 30, 2017

(65) Prior Publication Data
US 2023/0139242 A1 May 4, 2023

(51) Int. Cl.
*G08G 1/01* (2006.01)
*G08G 1/00* (2006.01)

(52) U.S. Cl.
CPC ......... *G08G 1/0141* (2013.01); *G08G 1/0112* (2013.01); *G08G 1/0116* (2013.01); *G08G 1/20* (2013.01)

(58) Field of Classification Search
CPC .. G08G 1/0141; G08G 1/0112; G08G 1/0116; G08G 1/20
(Continued)

(56) References Cited

U.S. PATENT DOCUMENTS 6,028,550 A * 2/2000 Froeberg ................ G01C 21/28 701/428
9,014,632 B2 * 4/2015 Peterson .............. G08G 1/0116 701/119
(Continued)

FOREIGN PATENT DOCUMENTS

DE 4328939 A1 3/1995
EP 2575399 A1 4/2013

OTHER PUBLICATIONS

SAE J2735, Surface Vehicle Standard, Dedicated Short Range Communications (DSRC) Message Set Dictionary, Sep. 2015/Mar. 2016, pp. 1-267.
(Continued)

*Primary Examiner* — Kerri L McNally
*Assistant Examiner* — Thang D Tran
(74) *Attorney, Agent, or Firm* — Schmeiser, Olsen & Watts, LLP

(57) ABSTRACT

To track the path of moving objects without using object-identifying information, e.g. GPS information of the object or other individual identifiers by means which an object can be basically identified, or if the objects continue to change their respective identity, it is proposed how a statement can be made about the successful tracking with respect to at least some of the object group along the tracking route on the basis of the acquisition of information, taking place along a tracking route repeatedly with non-object-identifying parameter data which is emitted by the moving objects, at regular time intervals, by object-group-specific considerations of the acquired parameter data, of group-specific data profiles, acquired from these considerations, and a data profile similarity comparison, and tracking information is generated, and otherwise no such statement is possible and the generation of the tracking information does not occur.

18 Claims, 4 Drawing Sheets

Figure 1:
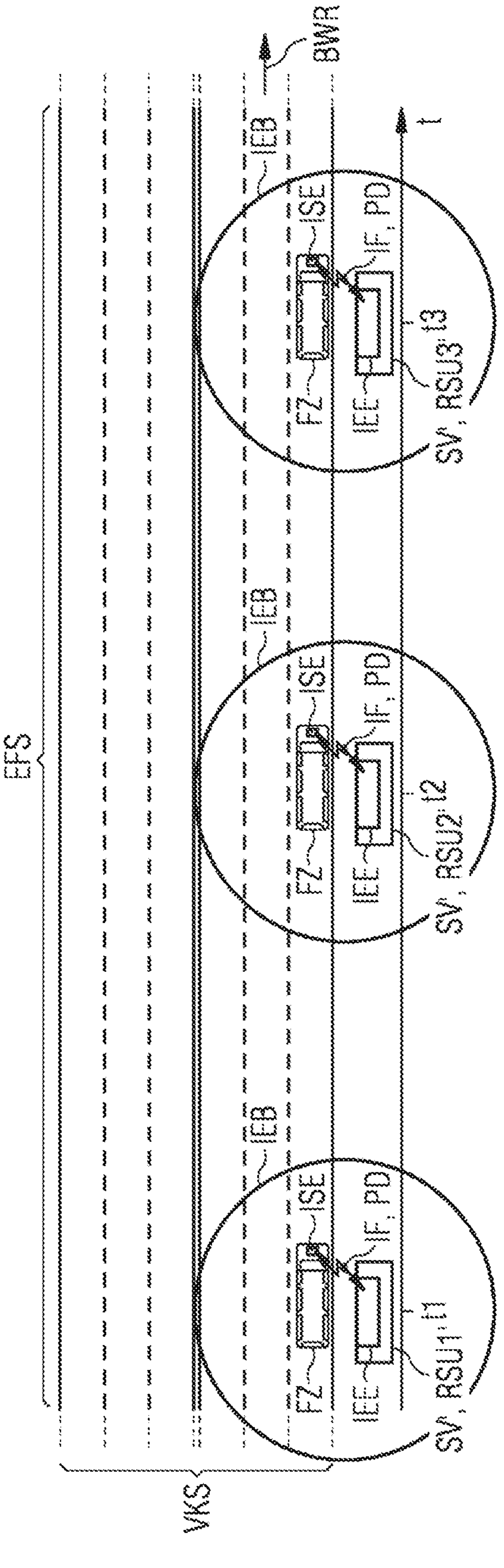
FIG 1 PRIOR ART

(58) Field of Classification Search
USPC .......................................................... 340/933
See application file for complete search history.

(56) References Cited

U.S. PATENT DOCUMENTS 9,442,176 B2 * 9/2016 Bulan .............. G08G 1/096716
9,672,734 B1 * 6/2017 Ratnasingam .......... H04W 4/44
2002/0026278 A1 * 2/2002 Feldman .............. G08G 1/0104 701/414
2003/0043739 A1 * 3/2003 Reinold .................. H04L 45/30 370/228
2003/0045234 A1 * 3/2003 Remboski ............... H04L 45/22 455/41.1
2003/0051131 A1 * 3/2003 Reinold .................. H04L 45/28 713/153
2003/0096621 A1 * 5/2003 Jana ........................ H04W 4/08 455/445
2005/0256640 A1 * 11/2005 Sigurdsson ............ G07C 5/008 701/468
2007/0124306 A1 * 5/2007 Nelson ................ H03M 7/3088
2008/0255754 A1 * 10/2008 Pinto .................. G01C 21/3691 701/119
2009/0309757 A1 * 12/2009 Mudalige ............... G08G 1/164 340/936
2010/0232404 A1 * 9/2010 Chen ....................... H04W 4/44 370/470
2010/0265101 A1 * 10/2010 Takenaga ............... G08G 1/167 340/933
2012/0166080 A1 * 6/2012 Hung ................... G08G 1/0175 701/466
2014/0032015 A1 * 1/2014 Chun ..................... G08G 1/166 701/2
2014/0123323 A1 * 5/2014 Jung ....................... H04L 67/60 726/30
2014/0274182 A1 * 9/2014 Menzel .................... H04B 7/04 455/509
2014/0280177 A1 * 9/2014 Ishii ...................... G06F 16/285 707/740
2014/0307628 A1 * 10/2014 Stahlin .................... H04L 45/24 370/328
2014/0350848 A1 * 11/2014 Moerman ............... G01S 19/48 701/522
2016/0078758 A1 * 3/2016 Basalamah .......... G08G 1/0141 701/118
2016/0239924 A1 * 8/2016 Fields ................... G06F 3/0482
2016/0323233 A1 * 11/2016 Song ....................... H04L 67/52
2016/0343250 A1 * 11/2016 Yoshii .................... G08G 1/017
2017/0032402 A1 * 2/2017 Patsiokas ........... G06Q 30/0207
2018/0159935 A1 * 6/2018 Cavalcanti .............. H04W 4/40
2018/0284265 A1 * 10/2018 Bilik ..................... G01S 13/931
2018/0295655 A1 * 10/2018 Cavalcanti ............ H04W 76/10
2019/0011921 A1 * 1/2019 Wang ..................... G05D 1/106

OTHER PUBLICATIONS

ETSI TS 102 637-2 V1.2.1 (Mar. 2011), Intelligent Transport Systems (ITS); Vehicular Communication; Basic Set of Applications; Part 2: Specification of Cooperative Awareness Basic Service, pp. 1-18.

International Search Report for PCT/EP2016/06793.

* cited by examiner

METHOD, DEVICE AND ARRANGEMENT FOR TRACKING MOVING OBJECTS

CROSS-REFERENCE TO RELATED APPLICATIONS

This application claims priority to PCT Application No. PCT/EP2016/061793, having a filing date of May 25, 2016, the entire contents of which are hereby incorporated by reference.

FIELD OF TECHNOLOGY

The tracking (tracking and tracing) of objects moving in space, for example any type of vehicles moving with respect to land, air and water (for example motor vehicles, rail vehicles, aircraft and watercraft, bicycle, etc.) and moving living things (for example human and animal), is, in addition to the guidance of said objects, a possible field of application for the use of navigation systems, for example the Global Positioning System (GPS) or GALILEO system, for assisting control or monitoring systems (for example traffic control centers during traffic control).

BACKGROUND

Accordingly, GPS-based systems having GPS receivers assigned to the moving objects and/or ground stations for receiving the satellite signals emitted by the GPS satellites orbiting the Earth are widespread. In order to determine the respective object location (position determination) by means of radiolocation, one-way distance measurements (time-synchronous measurements of the propagation times of the satellite signals each multiplied by the speed of light) are carried out by the GPS receiver during triangulation (consideration of the signals from three satellites) or quadrangulation (consideration of the signals from four satellites).

In addition to this satellite-based tracking of said moving objects, there are also terrestrial radio-based systems which could be fundamentally used to track the trail of moving objects of said type.

Such systems include "intelligent transport systems (ITS)" in which, for the purposes of traffic telematics, data based on the road traffic are captured, transmitted and processed using information and communication technologies and are used to provide information on the traffic and to organize, control and/or guide said traffic. If such data are interchanged, on the one hand, between the individual road users (for example motor vehicle drivers, cyclists, pedestrians, etc.) and, on the other hand, between the road user and the traffic infrastructure (for example array of traffic systems)—this is then also referred to as V2X ("vehicle to X") communication—, a cooperative ITS is involved, in which a V2X communication unit is assigned to each road user and to each traffic system. This assignment is such that the V2X communication unit is arranged in the vehicle belonging to the road user as a vehicle-independent, separate "on-board unit (OBU)" in the vehicle or has already been integrated in the on-board electronics of the vehicle or, if the road user participates in the traffic as a pedestrian, is carried by the road user, for example as a PDA (personal digital assistant) device similar to a cell phone or smartphone, and the V2X communication unit is included in the traffic system as a retrofit kit or as an integral part.

The term "cooperative" is used because the ITS assists the road user with its traffic-related tasks, for example in dangerous situations in traffic and to help to avoid accidents in this case. All of this is carried out by means of mutual communication between the road users which, as a result, continuously interchange information and warnings in real time. Each road user regularly, for example approximately ten times per second, communicates its own state to all other V2X receivers. This is carried out, for example, in the form of messages (information)—also referred to as status messages (status information)—having object-identifying and vehicle-identifying information parameters, for example a (pseudonymous) identifier (ID) and a (pseudonymous) message certificate identifier (certificate ID) and having non-object-identifying and non-vehicle-identifying information parameters which indicate, for example, position, time stamp, direction of travel, speed, vehicle type, etc. This status message (status information) is transmitted by the V2X communication unit, which is used by the road user as a motor vehicle driver or cyclist or as a pedestrian, with the stated periodicity of approximately 10 times per second and can then be received both by all other road users and by the infrastructure, that is to say the traffic systems, with the aid of V2X communication units.

With the cooperative ITS configured in this manner, the trail of each road user could now be fundamentally tracked and statements relating to the local traffic flow could be obtained thereby. However, for reasons of data protection law and in order to make the persons in the vehicle or the person as a pedestrian untrackable, the state regularly transmitted with the status message (status information) is anonymized, that is to say the use of the (pseudonymous) identifier (ID) and of the (pseudonymous) message certificate identifier (certificate ID) is rendered unusable, in principle. This occurs in such a manner that the identifier (ID) and/or the certificate ID is/are changed in the interval of approximately 1 minute, for example.

As a result of the anonymization of the transmitted status messages (status information) and the irregular change of identity (for example approximately 1 minute), it is no longer reliably possible to determine traffic information at different locations along a route for tracking (cf. FIG. 1) on account of the changing identity. As a result, neither a user of the V2X communication unit nor the movement trail of the vehicle used by said user or the user's own movement trail as a pedestrian can be tracked. However, from the point of view of traffic, it would be desirable to track the behavior of individual road users over a relatively long time in order to better capture traffic flows on longer routes. The traffic information measured at different points along a route would enable more detailed statements to be made on the traffic flow.

FIG. 1 shows a cooperative ITS scenario with respect to a road VKS, a section of which is illustrated and which is in the preferred form of a freeway, on which a vehicle FZ (this is a bus, for example, in the illustrated FIG. 1; but it could also be another vehicle, for example an automobile, a truck, a motorcycle, a bicycle, etc.) respectively drives past a stationary road device SV' in the form of a "roadside unit" RSU' in a direction of movement (direction of travel) BWR at different times t1, t2, t3. The vehicle FZ thus passes a first "roadside unit" RSU1' at the time t1, a second "roadside unit" RSU2' at the time t2 and a third "roadside unit" RSU3' at the time t3. The road device SV' or the "roadside unit" RSU', RSU1', RSU2', RSU3' may be any desired technical system which belongs to the traffic infrastructure, controls the traffic and/or provides information relating to the traffic and/or an electronic device which is configured for this purpose and is preferably capable of V2X communication, as already mentioned above. In this case, the road devices SV' or the "roadside units" RSU1', RSU2', RSU3' are passed by the vehicle FZ along a capture route EFS of the road VKS.

Reference is made to a capture route because the vehicle FZ preferably transmits or emits an item of information IF at regular intervals of time, for example every 100 ms, via a radio signal which needs to be captured. For this purpose, the vehicle FZ has an information transmitting device ISE which is preferably in the form of the V2X communication unit and is also again integrated in the on-board electronics of the vehicle (for example if the vehicle is a "non-legacy vehicle") or else is in the form of a vehicle-independent, separate device (for example if the vehicle is a "legacy vehicle"). This information IF contains a multiplicity of parameter data items PD belonging to information parameters according to the following table for FIG. 1 (Table-FIG. 1).

As soon as the vehicle FZ with the information transmitting device ISE emitting the information IF enters or drives into an information capture region IEB of an information capture device IEE in the road device SV' or in the "roadside unit" RSU', RSU1', RSU2', RSU3', the information IF emitted by the information transmitting device ISE with the parameter data PD at the times t1, t2, t3 is captured by the information capture device IEE. The information capture region IEB reaches its maximum extent when the information IF emitted by the information transmitting device ISE can no longer be received by the information capture device IEE.

As a result of the anonymization of the transmitted information IF with the parameter data PD, which was carried out on account of the changing object-identifying parameter data PD, it is thus readily virtually impossible to track the trail of the vehicle FZ on the basis of the received parameter data PD and to make a statement on the traffic flow on the road VKS along the capture route EFS. As a result, it is not possible to determine any traffic data in the conventional sense since the identification of the vehicle fails.

TABLE

FIG. 1

| Emitted information (IF) with information parameter | Parameter data (PD) emitted with respect to the vehicle (FZ) at times (t1, t2, t3) t1 | t2 | t3 |
|---|---|---|---|
| (Pseudonymous) identifier ID | = 100123 | = 100123 | = 567001 |
| (Pseudonymous) information certificate ID | = xy12789 | = xy12789 | = 83df02 |
| Certificate authority | = certauth123 | = certauth123 | = certauth123 |
| Position (WGS84) | = Lat: XX.xxx(t1)/ Lon: YY.yyy(t1) | = Lat: XX.xxx(t2)/ Lon: YY.yyy(t2) | = Lat: XX.xxx(t3)/ Lon: YY.yyy(t3) |
| Time stamp | = dd.MM.yyyy(t1)/ HH:mm:ss(t1) | = dd.MM.yyyy(t2)/ HH:mm:ss(t2) | = dd.MM.yyyy(t3)/ HH:mm:ss(t3) |
| Type | = Bus | = Bus | = Bus |
| Direction of travel | = west | = west | = west |
| Speed | = 120 km/h | = 130 km/h | = 125 km/h |
| Length | = 7.20 m | = 7.20 m | = 7.20 m |
| Width | = 2.35 m | = 2.35 m | = 2.35 m |
| Optional parameters | = . . . | = . . . | = . . . |

In the case of the information parameters and the corresponding parameter data PD, a distinction is made between (i) information parameters and associated parameter data PD which are used to uniquely identify the information transmitting device ISE as the transmission source of the information IF and therefore ultimately also the vehicle FZ and the data values of which, as already stated above, are continuously changed at regular intervals of time (for example in the region of approximately 1 minute) for anonymization purposes—these information parameters and parameter data PD are referred to below as object-identifying information parameters and parameter data PD—and (ii) information parameters and associated parameter data PD which are used to characterize, indicate, type, etc., but not uniquely identify, the vehicle in which the information transmitting device ISE is situated as the transmission source of the information IF and the data values of which are not changed—these information parameters and parameter data PD are referred to below as non-object-identifying information parameters and parameter data PD.

In said Table-FIG. 1, the object-identifying information parameters and parameter data PD are indicated with gray shading, whereas the non-object-identifying information parameters and parameter data PD do not have any background shading (for example with respect to a gray scale and/or pattern) (white background in Table-FIG. 1). The table Table-FIG. 1 illustrates how the object-identifying parameter data PD at the time t3 have changed in comparison with the object-identifying parameter data PD at the times t1, t2.

Conclusion: there is currently no legal, technically sophisticated and cost-effective solution for determining long-term traffic data. There are solutions in which taxi fleets have been equipped with SMS transmitters or solutions in which trails of the hands-free devices (for example Bluetooth) in vehicles, for example, are used at different locations to determine traffic data. However, methods in which object-identifying and vehicle-identifying information, that is to say indicators of identity, are used are problematic, subject to approval or are not allowed at all in the first place for legal reasons (for example owing to protection of privacy).

SUMMARY

An aspect relates to a method, a device and an arrangement for tracking moving objects, in which the trail of the objects can be tracked without using object-identifying information, for example GPS information relating to the object or other individual identifiers which can be used to fundamentally identify an object or when the objects continuously change their respective identity.

The idea on which embodiments of the invention is based is how—with respect to the present proposal for a method, a device and an arrangement for tracking moving objects—a statement on the successful tracking of at least one part of the object group along a tracking route is obtained on the basis of the capture of information with non-object-identifying parameter data, emitted by the moving objects, preferably at regular intervals of time, which takes place along the tracking route repeatedly, in particular at different locations at different times, by means of object-group-specific considerations of the captured parameter data, group-specific data profiles obtained from these considerations and a data profile similarity comparison and how, in this respect, an item of tracking information is generated, which is not generated if such a statement is not possible.

Quite generally, the technical teaching outlined above with respect to the tracking of moving objects can be used wherever a statement on successful or failed tracking can be made using information with data relating to a plurality of information parameters, even if they have been partially anonymized, which information is obtained repeatedly, in particular at different locations at different times. This applies, for example, to the tracking of vehicles in road traffic (keyword: traffic telematics), to the tracking of humans and animals in public space and/or in nature (keyword: monitoring of persons and animals), etc.

With respect to the application for traffic telematics (for example the tracking of vehicles in road traffic using an "intelligent transport system (ITS)"), a traffic flow over relatively long routes can consequently be determined from ITS status messages (ITS status information) obtained repeatedly, in particular at different locations at different times, even if they have been anonymized.

This involves, in particular, the fact that:

a) combinations of particular special characterizing parameters of ITS status messages (for example a "cooperative awareness message <CAM>" according to the ETSI standard "ETSI TS 102 637-2" for Europe or a "basic safety message <BSM>" according to the SAE standard "SAE J2735" for the USA as claimed in claims 6 and 15) are used. If a plurality of parameters are available, they can be used for identification from the point of view of traffic. Not only the values of the parameters but also the change and their time-dependent change (for example every 10 minutes) of some parameters can provide information on the manufacturer (for example the changing of certificates for the cryptographic signature of transmitted messages). In addition, the authority issuing certificates can provide information relating to the manufacturer of the vehicle or a group of vehicle manufacturers. As a result of this unique combination of a plurality of parameters of the messages transmitted by the vehicle, the vehicle can be uniquely identified from the point of view of traffic and, as a result, it is possible to capture the vehicle at different reception points (for example at "roadside units (RSU)"). This makes it possible to determine, for example, travel data, traffic jam information along a route.

b) combinations of particular special characterizing parameters of the status information transmitted by a group of vehicles are used. This expands case a) from one vehicle to a plurality of vehicles. As a result, the parameters of the different status information from a group of vehicles are combined and calculated as a unique indicator (=footprint, stamp, etc.). On a freeway for example, the grouping of vehicles on relatively long routes is constant (for example in the case of a convoy of trucks). This makes it possible to create a plurality of unique traffic indicators which are identified at different information capture points without infringing the anonymity of the individual vehicles.

As a result of the fact that specific vehicle parameters of a vehicle group are determined and combined, it is possible to determine a so-called "group footprint" of a vehicle group driving past a "V2X roadside unit" (for example a first "roadside unit" RSU1). This "group footprint" can then be used to identify the vehicle group by further "V2X roadside units" (for example a second "roadside unit" RSU2 and/or a third "roadside unit" RSU3) downstream along the route. The more vehicles homogeneously drive together in the group, the higher the correlation at the further "V2X roadside unit" measurement points (RSU2, RSU3). This makes it possible to determine traffic variables such as journey time, traffic jam, accident, etc. If vehicles leave the group along the journey (for example overtaking, exit, etc.), the "group footprint" should always be determined as a combination of a plurality of parameters within the vehicle group. The larger the group, the easier the correlation of the different parameters at the different "V2X roadside unit" installations.

This makes it possible to capture traffic data from vehicles with changing identities (pseudonyms) along a relatively long route. This capture was previously not possible (using conventional methods) on account of the changing identity. Instead, the traffic data could be captured only in the region of an individual roadside unit.

Advantageous developments of the technical teaching respectively stated in the independent patent claims are claimed in the patent claims respectively dependent thereon.

In the case of the V2X-specific ITS status messages (ITS status information), the following vehicle-specific, vehicle-characteristic message parameters can be used, for example, in a "cooperative awareness message <CAM>" as claimed in claims 7 and 16:

- type of different vehicles belonging to the road users, for example bus, automobile, motorcycle, etc., in the group;
- time stamp of vehicles belonging to the road users in the group should be close in terms of time;
- position of different vehicles belonging to the road users in the group should be adjacent;
- direction of vehicles belonging to the road users in the group should be the same;
- speed of vehicles belonging to the road users in the group should be comparable;
- length of different vehicles belonging to the road users is used as a group identifying feature;
- width of different vehicles belonging to the road users is used as a group identifying feature;
- issuing authority of the cryptographic certificates for the signature of the status messages;
- certificate hierarchy for validating the certificate for the signature of the status messages;
- repetition rate of the change of the parameters;
- etc.

In addition, it is possible for vehicles to transmit further optional data elements in the status message which are used to identify a vehicle group.

BRIEF DESCRIPTION

Figure 2:
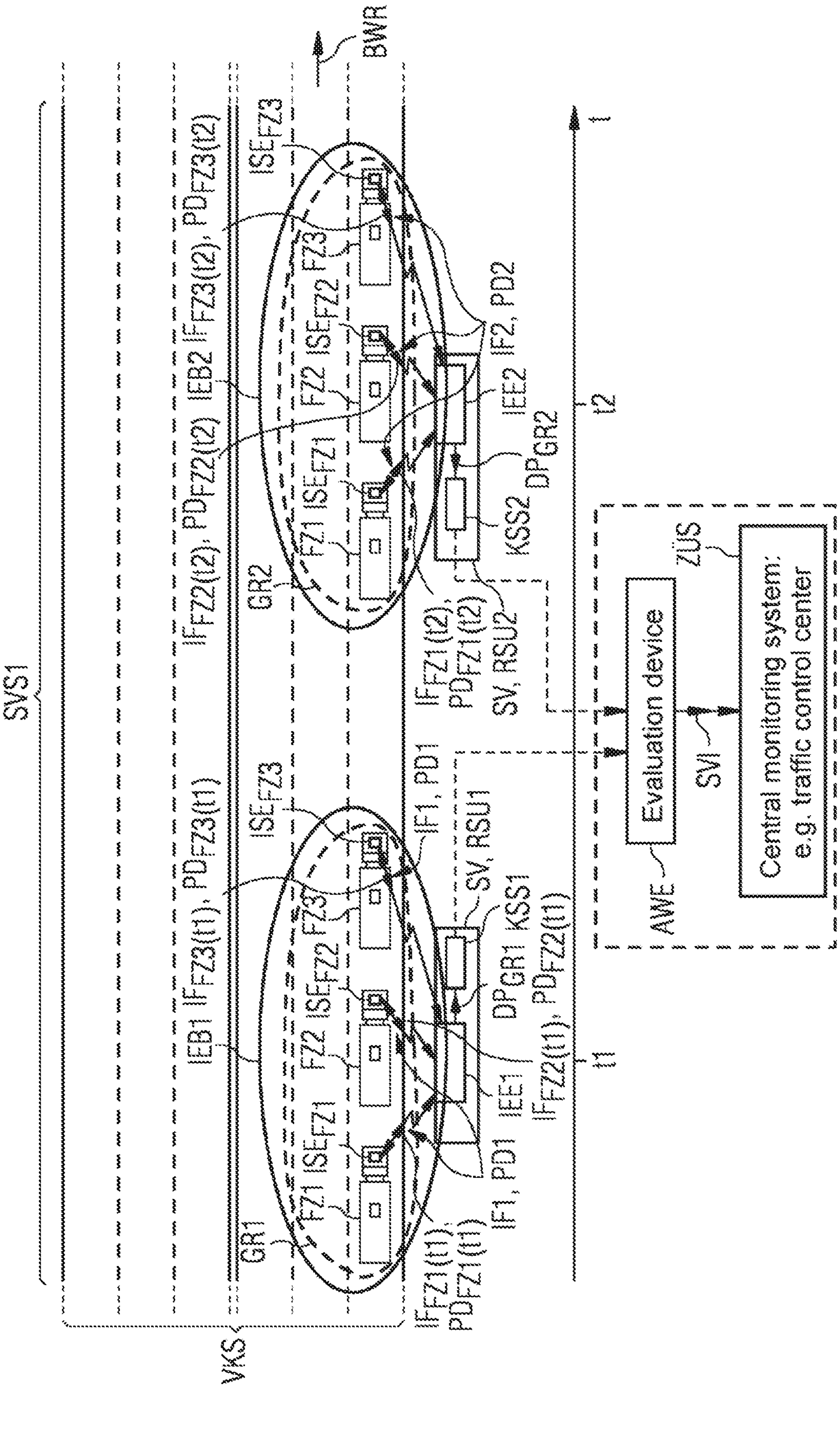
Figure 3:
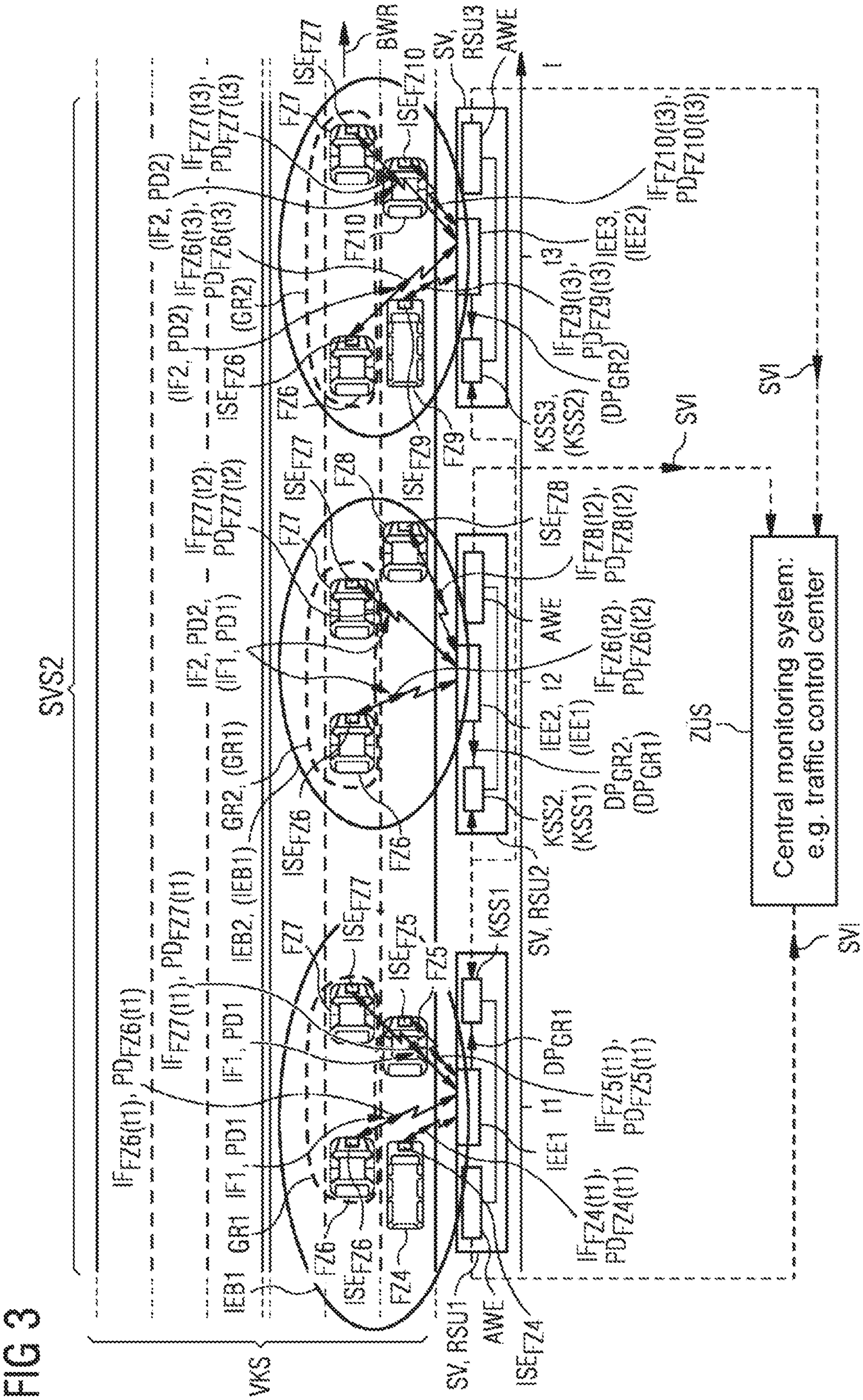
Figure 4:
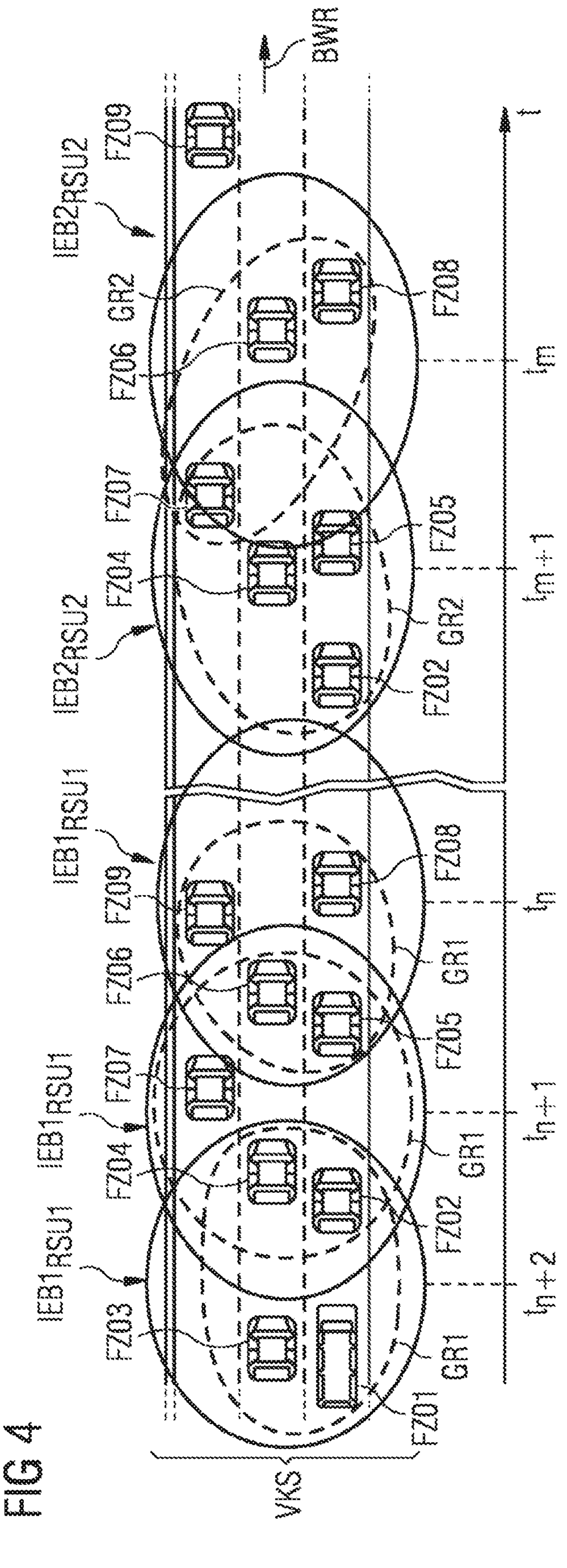

Some of the embodiments will be described in detail, with references to the following Figures, wherein like designations denote like members, wherein:

FIG. 1 shows a prior art cooperative ITS scenario with respect to a road VKS, a section of which is illustrated and which is in the preferred form of a freeway, on which a vehicle FZ drives past a stationary road devices SV in the form of a "roadside units" RSU' in a direction of movement (direction of travel) BWR at different times t1, t2, t3, FIG. 2 shows, proceeding from the ITS scenario illustrated in FIG. 1, a first expanded cooperative ITS scenario for tracking at least one vehicle from a multiplicity of vehicles moving on the road or the freeway, in which a statement for tracking is obtained in a central unit, FIG. 3 shows, proceeding from the ITS scenario illustrated in FIG. 1, a second expanded cooperative ITS scenario for tracking at least one vehicle from a multiplicity of vehicles moving on the road or the freeway, in which a statement for tracking is obtained in a local unit; and FIG. 4 shows, on the basis of the expanded cooperative ITS scenario for tracking according to FIG. 2, the influence of dynamically changing affiliations of vehicles driving on the route or the freeway to the first group with respect to the first "roadside unit" having the first information capture region and to the second group with respect to the first "roadside unit" having the first information capture region on the similarity comparison (correlation check) to be carried out during the vehicle tracking according to FIG. 2.

DETAILED DESCRIPTION

Proceeding from the ITS scenario illustrated in FIG. 1, FIG. 2 shows a first expanded cooperative ITS scenario for tracking at least one vehicle from a multiplicity of vehicles FZ1, FZ2, FZ3 moving on the road or the freeway VKS, in which a statement for tracking is obtained in a central unit.

In this expanded cooperative scenario, three vehicles—a first vehicle FZ1, a second vehicle FZ2 and a third vehicle FZ3—which are all trucks, for example, according to FIG. 2, but any other vehicle type, for example automobile, bus, motorcycle, bicycle, etc. would be possible, are moving at an approximately comparable speed on the road or the freeway VKS in the direction of movement BWR. In this case, this convoy of trucks respectively drives past a stationary modified road device SV in the form of a modified "roadside unit" RSU at times t1, t2. This vehicle convoy formed from the vehicles FZ1, FZ2, FZ3 therefore passes a first modified "roadside unit" RSU1 at the time t1 and a second modified "roadside unit" RSU2 at the time t2. The road device SV or the "roadside unit" RSU1, RSU2 can again be any desired technical system which belongs to the traffic infrastructure, controls the traffic and/or provides information on the traffic and/or an electronic device which is configured for this purpose and is preferably capable of V2X communication, as already mentioned above. The road devices SV or the "roadside units" RSU1, RSU2 are passed by the vehicle convoy in this case along a first tracking route SVS1 of the road VKS.

The first tracking route SVS1 is also, at the same time, a capture route because each vehicle FZ1, FZ2, FZ3 in the convoy preferably transmits or emits an item of information $IF_{FZ1}$, $IF_{FZ2}$, $IF_{FZ3}$ corresponding to the vehicle at regular intervals of time, for example every 100 ms, via a radio signal which needs to be captured. For this purpose, each vehicle FZ1, FZ2, FZ3 has an information transmitting device $ISE_{FZ1}$, $ISE_{FZ2}$, $ISE_{FZ3}$ corresponding to the vehicle which is preferably in the form of the V2X communication unit and is also again integrated in the on-board electronics of the vehicle (for example if the vehicle is a "non-legacy vehicle") or else is in the form of a vehicle-independent separate device (for example if the vehicle is a "legacy vehicle"). Each item of information of this information $IF_{FZ1}$, $IF_{FZ2}$, $IF_{FZ3}$ corresponding to the vehicle contains a multiplicity of parameter data $PD_{FZ1}$, $PD_{FZ2}$, $PD_{FZ3}$ which accordingly correspond to the vehicle and belong to information parameters according to the following tables for FIG. 2 (Table-1-FIG. 2, Table-2-FIG. 2, Table-3-FIG. 2).

Table-1-FIG. 2 shows the information $IF_{FZ1}$ emitted by the vehicle FZ1 with the associated parameter data $PD_{FZ1}$, whereas Table-2-FIG. 2 shows the information $IF_{FZ2}$ emitted by the vehicle FZ2 with the associated parameter data $PD_{FZ2}$ and Table-3-FIG. 2 shows the information $IF_{FZ3}$ emitted by the vehicle FZ3 with the associated parameter data $FD_{FZ3}$.

TABLE 1

FIG. 2

| Information ($IF_{FZ1}$) emitted by the vehicle (FZ1) with data relating to information parameters ($PD_{FZ1}$) | Information ($IF_{FZ1,t1}$, $IF_{FZ1,t2}$) emitted at times (t1, t2) with parameter data ($PD_{FZ1,t1}$, $PD_{FZ1,t2}$) t1 | t2 |
|---|---|---|
| (Pseudonymous) identifier ID | = 370988 | = 440066 |
| (Pseudonymous) information certificate ID | = C5e4Jx1 | = 77gh07 |
| Certificate authority | = certauth155 | = certauth155 |
| Position (WGS84) | = Lat: XX.xxx(t1)/ Lon: YY.yyy(t1) | = Lat: XX.xxx(t2)/ Lon: YY.yyy(t2) |
| Time stamp | = dd.MM.yyyy(t1)/ HH:mm:ss(t1) | = dd.MM.yyyy(t2)/ HH:mm:ss(t2) |
| Type | = Truck | = Truck |
| Direction of travel | = west | = west |
| Speed | = 110 km/h | = 105 km/h |
| Length | = 17.00 m | = 17.00 m |
| Width | = 2.50 m | = 2.50 m |
| Optional parameters | = . . . | = . . . |

TABLE 2

| FIG. 2 | | |
|---|---|---|
| Information ($IF_{FZ2}$) emitted by the vehicle (FZ2) with | Information ($IF_{FZ2, t1}$, $IF_{FZ2, t2}$) emitted at times (t1, t2) with parameter data ($PD_{FZ2, t1}$, $PD_{FZ2, t2}$) | |
| data relating to information parameters ($PD_{FZ2}$) | t1 | t2 |
| (Pseudonymous) identifier ID | = 59780 | = 123456 |
| (Pseudonymous) information certificate ID | = mk982 | = an761 |
| Certificate authority | = certauth105 | = certauth105 |
| Position (WGS84) | = Lat: XX.xxx(t1)/ Lon: YY.yyy(t1) | = Lat: XX.xxx(t2)/ Lon: YY.yyy(t2) |
| Time stamp | = dd.MM.yyyy(t1)/ HH:mm:ss(t1) | = dd.MM.yyyy(t2)/ HH:mm:ss(t2) |
| Type | = Truck | = Truck |
| Direction of travel | = west | = west |
| Speed | = 112 km/h | = 107 km/h |
| Length | = 12.50 m | = 12.50 m |
| Width | = 2.60 m | = 2.60 m |
| Optional parameters | = . . . | = . . . |

TABLE 3

| FIG. 2 | | |
|---|---|---|
| Information ($IF_{FZ3}$) emitted by the vehicle (FZ3) with | Information ($IF_{FZ3, t1}$, $IF_{FZ3, t2}$) emitted at times (t1, t2) with parameter data ($PD_{FZ3, t1}$, $PD_{FZ3, t2}$) | |
| data relating to information parameters ($PD_{FZ3}$) | t1 | t2 |
| (Pseudonymous) identifier ID | = 54510 | = 456789 |
| (Pseudonymous) information certificate ID | = 1w389 | = 3o7hj |
| Certificate authority | = eurp2491 | = eurp2491 |
| Position (WGS84) | = Lat: XX.xxx(t1)/ Lon: YY.yyy(t1) | = Lat: XX.xxx(t2)/ Lon: YY.yyy(t2) |
| Time stamp | = dd.MM.yyyy(t1)/ HH:mm:ss(t1) | = dd.MM.yyyy(t2)/ HH:mm:ss(t2) |
| Type | = Truck | = Truck |
| Direction of travel | = west | = west |
| Speed | = 114 km/h | = 103 km/h |
| Length | = 14.10 m | = 14.10 m |
| Width | = 2.45 m | = 2.45 m |
| Optional parameters | = . . . | = . . . |

In the case of the information parameters contained in the tables and the parameter data $PD_{FZ1}$, $PD_{FZ2}$, $PD_{FZ3}$ corresponding to the vehicle, a distinction is again made between (i) information parameters and associated parameter data $PD_{FZ1}$, $PD_{FZ2}$, $PD_{FZ3}$ which are used to uniquely identify the respective information transmitting device $ISE_{FZ1}$, $ISE_{FZ2}$, $ISE_{FZ3}$ corresponding to the vehicle as the transmission source of the information $IF_{FZ1}$, $IF_{FZ2}$, $IF_{FZ3}$ and therefore ultimately also the respective vehicle FZ1, FZ2, FZ3 and the data values of which, as already stated above, are continuously changed at regular intervals of time (for example in the region of approximately 1 minute) for anonymization purposes—these information parameters and parameter data $PD_{FZ1}$, $PD_{FZ2}$, $PD_{FZ3}$ are referred to below as object-identifying information parameters and parameter data $PD_{FZ1}$, $PD_{FZ2}$, $PD_{FZ3}$—and (ii) information parameters and associated parameter data $PD_{FZ1}$, $PD_{FZ2}$, $PD_{FZ3}$ which are used to characterize, indicate, type, etc., but not uniquely identify, the respective vehicle FZ1, FZ2, FZ3 in which the information transmitting device $ISE_{FZ1}$, $ISE_{FZ2}$, $ISE_{FZ3}$ corresponding to the vehicle is situated as the transmission source of the information $IF_{FZ1}$, $IF_{FZ2}$, $IF_{FZ3}$ and the data values of which are not changed—these information parameters and parameter data $PD_{FZ1}$, $PD_{FZ2}$, $PD_{FZ3}$ are referred to below as non-object-identifying information parameters and parameter data $PD_{FZ1}$, $PD_{FZ2}$, $PD_{FZ3}$.

In said tables, Table-1-FIG. 2 to Table-3-FIG. 2, the object-identifying information parameters and parameter data $PD_{FZ1}$, $PD_{FZ2}$, $PD_{FZ3}$ are again indicated with gray shading, whereas the non-object-identifying information parameters and parameter data $PD_{FZ1}$, $PD_{FZ2}$, $PD_{FZ3}$ again do not have any background shading (for example with respect to a gray scale and/or pattern) (white background in said tables). Said tables each illustrate how the object-identifying parameter data $PD_{FZ1}$, $PD_{FZ2}$, $PD_{FZ3}$ at the time t2 have changed in comparison with the object-identifying parameter data $PD_{FZ1}$, $PD_{FZ2}$, $PD_{FZ3}$ at the time t1.

The number of information parameters (both with respect to the object-identifying parameters and with respect to the non-object-identifying parameters) respectively contained in the table is fundamentally open and can be increased or decreased in an arbitrary manner as required. In the present case, the parameters decisive for the exemplary embodiment are stated.

The meaning of these stated parameters and their data values are generally known and therefore do not require any further explanation at this point. When selecting the parameters, it should be taken into account (criteria catalog) that, for example, preferably different vehicle types of the road users, for example bus, automobile, motorcycle, etc., are captured;

the time stamp of the captured vehicles belonging to the road users should be as close as possible in terms of time;

the position of the captured different vehicles belonging to the road users should be as adjacent as possible;

the direction of the captured vehicles belonging to the road users should be as identical as possible;

the speed of the captured vehicles belonging to the road users should be as comparable as possible;

the length of the captured different vehicles belonging to the road users should be used as a (group) identifying feature;

the width of different vehicles belonging to the road users should be used as a (group) identifying feature;

the issuing authority of the cryptographic certificates is used for the signature of the status messages;

certificate hierarchy for validating the certificate is used for the signature of the status messages;

repetition rate of the change of the parameters is used.

If the vehicles FZ1, FZ2, FZ3 in the convoy having the information transmitting devices $ISE_{FZ1}$, $ISE_{FZ2}$, $ISE_{FZ3}$ corresponding to the vehicle and emitting the information $IF_{FZ1}$, $IF_{FZ2}$, $IF_{FZ3}$ corresponding to the vehicle are in a first information capture region IEB1 of a first information capture device IEE1 of the modified first "roadside unit" RSU1, information $IF_{FZ1,t1}$, $IF_{FZ2,t1}$, $IF_{FZ3,t1}$ emitted by the information transmitting devices $ISE_{FZ1}$, $ISE_{FZ2}$, $ISE_{FZ3}$ of the vehicles FZ1, FZ2, FZ3 at the time t1 is captured by the first information capture device IEE1 with parameter data $PD_{FZ1,t1}$, $PD_{FZ2,t1}$, $PD_{FZ3,t1}$. In a similar manner to the information capture region IEB in FIG. 1, the first information capture region IEB1 reaches its maximum extent when the information $IF_{FZ1}$, $IF_{FZ2}$, $IF_{FZ3}$ emitted by the information transmitting device $ISE_{FZ1}$, $ISE_{FZ2}$, $ISE_{FZ3}$ can no longer be received by the first information capture device IEE1.

In order to be able to now track at least one vehicle in the vehicle convoy FZ1, FZ2, FZ3 in the expanded cooperative ITS scenario, in contrast to the cooperative ITS scenario explained above on the basis of FIG. 1, first information IF1 with first parameter data PD1 from the maximum quantity of information predefined at the time t1 by the information $IF_{FZ1,t1}$, $IF_{FZ2,t1}$, $IF_{FZ3,t1}$ with the parameter data $PD_{FZ1,t1}$, $PD_{FZ2,t1}$, $PD_{FZ3,t1}$ is captured from a first group GR1 of the vehicles FZ1, FZ2, FZ3, which comprises at least one vehicle, but preferably a plurality of vehicles with the proviso "The greater the number of groups, the easier the correlation of the different parameter data from the information capture region". When taking into account or stipulating the number of vehicles in the first group GR1, the criteria catalog mentioned above should be used when selecting the parameters.

In the present case, at the time t1 according to FIG. 2, the three vehicles FZ1, FZ2, FZ3 form the first group GR1 even if the vehicle type is the same contrary to the criteria catalog because, for example, the speed of the vehicles is comparable and the prerequisite that the time stamps of the captured vehicles are close in terms of time and the position of the captured vehicles is adjacent is present (as illustrated in principle in FIG. 2). The information $IF_{FZ1,t1}$, $IF_{FZ2,t1}$, $IF_{FZ3,t1}$ emitted by the vehicles FZ1, FZ2, FZ3 at the time t1 with the parameter data $PD_{FZ1,t1}$, $PD_{FZ2,t1}$, $PD_{FZ3,t1}$ is the first information IF1 with the first parameter data PD1 as a result of the capture affiliation of said vehicles to the first group GR1 at the time t1.

For the further performance of the tracking, the first information capture device IEE1 is now designed, preferably using generally conventional data processing means (for example a hardware unit based on a microprocessor and a memory component and program modules which can be operated and executed as software on the hardware unit), in such a manner that a data profile $DP_{GR1}$ specific to the first group, in particular a group footprint or a group stamp of the vehicle group, is generated from the captured first parameter data PD1.

This data profile $DP_{GR1}$ specific to the first group is then forwarded in the modified first "roadside unit" RSU1 from the first information capture device IEE1 to a first communication interface KSS1 which is connected to the first information capture device IEE1 and provides the data profile $DP_{GR1}$ specific to the first group and received from the first information capture device IEE1 for data evaluation based on a similarity comparison of data profiles. How, when and where this data profile similarity comparison takes place is explained further below in connection with the description of FIG. 2.

In the interim, while the first data profile is generated and forwarded as described, the vehicle convoy moves further along the first tracking route SVS1 on the road or the freeway VKS. Since the vehicles FZ1, FZ2, FZ3 in the convoy are moving at a comparable speed and if one of the vehicles does not leave the road or the freeway VKS—for example for a stop at a gas station or a rest area or else to continue the journey on another road—or one of the vehicles does not inevitably leave the convoy as a result of a vehicle defect, for example engine damage, and does not drive at the edge of the road (on the shoulder in the case of the freeway) and stop, it can be assumed that the vehicle convoy is also still moving together on the road or the freeway VKS along the first tracking route SVS1.

In the expanded cooperative ITS scenario illustrated in FIG. 2, in addition to the capture time t1, there is also a further time or a further point, the capture time t2 with the modified second "roadside unit" RSU2, for tracking the at least one vehicle in the vehicle convoy FZ1, FZ2, FZ3 along the first tracking route SVS1.

If the convoy with the vehicles FZ1, FZ2, FZ3 now approaches the second "roadside unit" RSU2 and all vehicles (owing to the comparable speed) having the information transmitting device $ISE_{FZ1}$, $ISE_{FZ2}$, $ISE_{FZ3}$ corresponding to the vehicle and emitting the information $IF_{FZ1}$, $IF_{FZ2}$, $IF_{FZ3}$ corresponding to the vehicle are finally in a second information capture region IEB2 of a second information capture device IEE2 of the second "roadside unit" RSU2, information $IF_{FZ1,t2}$, $IF_{FZ1,t2}$, $IF_{FZ3,t2}$ emitted by the information transmitting devices $ISE_{FZ1}$, $ISE_{FZ2}$, $ISE_{FZ3}$ of the vehicles FZ1, FZ2, FZ3 at the time t2 is captured by the second information capture device IEE2 with parameter data $PD_{FZ1,t2}$, $PD_{FZ2,t2}$, $PD_{FZ3,t2}$. The "roadside units" RSU1, RSU2 with the two information capture regions IEB1, IEB2 are arranged in a manner separated from one another by an arbitrarily selectable distance. In a similar manner to the information capture region IEB in FIG. 1 and the first information capture region IEB1, the second information capture region IEB2 also again reaches its maximum extent when the information $IF_{FZ1}$, $IF_{FZ2}$, $IF_{FZ3}$ emitted by the information transmitting device $ISE_{FZ1}$, $ISE_{FZ2}$, $ISE_{FZ3}$ can no longer be received by the second information capture device IEE2.

Like the first information capture device IEE1, the second information capture device IEE2 captures second information IF2 with second parameter data PD2 from the maximum quantity of information predefined at the time t2 by the information $IF_{FZ1,t2}$, $IF_{FZ2,t2}$, $IF_{FZ3,t2}$ with the parameter data $PD_{FZ1,t2}$, $PD_{FZ2,t2}$, $PD_{FZ3,t2}$ from a second group GR2 of the vehicles FZ1, FZ2, FZ3, which again comprises at least one vehicle, but preferably again a plurality of vehicles with the proviso "The greater the number of groups, the easier the correlation of the different parameter data from the information capture region", at regular intervals of time or for a calculated time window—for example by means of the calculation according to the formula s=v*t (distance equals speed times time), where s=distance between RSU1 and RSU2 and v=speed of the vehicle convoy according to the tables (cf. Table-1-FIG. 2 to Table-3-FIG. 2), the time t and by considering "±t" to be the time window—after capturing the first vehicle group GR1 in the first information capture region IEB1 for each interval of time or for each time window. When taking into account or stipulating the number of vehicles in the second group GR2, said criteria catalog should again be used when selecting the parameters.

In the present case, at the time t2 according to FIG. 2, the three vehicles FZ1, FZ2, FZ3 again form the second group GR2 even if the vehicle type is the same contrary to the criteria catalog because, for example, the speed of the vehicles is comparable and the prerequisite that the time stamps of the captured vehicles are close in terms of time and the position of the captured vehicles is adjacent is present (as illustrated in principle in FIG. 2). The information $IF_{FZ1,t2}$, $IF_{FZ2,t2}$, $IF_{FZ3,t2}$ emitted by the vehicles FZ1, FZ2, FZ3 at the time t2 with the parameter data $PD_{FZ1,t2}$, $PD_{FZ2,t2}$, $PD_{FZ3,t2}$ is the second information IF2 with the second parameter data PD2 as a result of the capture affiliation of said vehicles to the second group GR2 at the time t2.

During the further performance of the tracking, the second information capture device IEE2—like the first information capture device IEE1—is designed, preferably again using generally conventional data processing means (for example a hardware unit based on a microprocessor and a memory component and program modules which can be operated and executed as software on the hardware unit), in such a manner that a data profile $DP_{GR2}$ specific to the second group, in particular a group footprint or a group stamp of the vehicle group, is generated from the captured second parameter data PD2.

This data profile $DP_{GR2}$ specific to the second group is then forwarded in the modified second "roadside unit" RSU2 from the second information capture device IEE2 to a second communication interface KSS2 which is connected to the second information capture device IEE2 and provides the data profile $DP_{GR2}$ specific to the second group and received from the second information capture device IEE2 for data evaluation based on a similarity comparison of data profiles.

Two comparable variables, the two data profiles $DP_{GR1}$, $DP_{GR2}$, are now available for this data profile similarity comparison. The first data profile $DP_{GR1}$ is thus supplied by the first communication interface KSS1 in the first "roadside unit" RSU1, and the second data profile $DP_{GR2}$ is supplied by the second communication interface KSS2 in the second "roadside unit" RSU2, to a central unit in the form of an evaluation device AWE. The communication interfaces KSS1, KSS2 are connected to the evaluation device AWE for this purpose, wherein the connection may be wireless or wired, for example.

In order to perform the data profile similarity comparison, the evaluation device AWE is now designed, preferably using generally conventional means for the data-processing-based comparison of two variables (for example a hardware unit based on a microprocessor and a memory component and program modules which can be operated and executed as software on the hardware unit), in such a manner that the data profile $DP_{GR2}$ specific to the second group and provided by the second communication device KSS2 is compared with the data profile $DP_{GR1}$ specific to the first group and provided by the first communication device KSS1 using parameter data, in particular from a combination of the parameter data PD1, PD2 within the groups GR1, GR2.

If the data profile similarity comparison carried out in the evaluation device AWE reveals that the correlation between the first parameter data PD1 and the second parameter data PD2 is so great that the parameter data PD1, PD2 at least partially correspond, a statement can be made on the successful tracking of the vehicles FZ1, FZ2, FZ3 captured in the first group GR1 along the first tracking route SVS1 between the two information capture regions IEB1, IEB2. In this case, the evaluation device AWE produces or generates an item of tracking information SVI and forwards this information to a central monitoring entity ZÜS which is preferably in the form of a traffic control center and to which the evaluation device AWE is connected, for example in a wireless or wired manner. Otherwise, if the correspondence between the parameter data PD1, PD2 is not so great, such a statement is not possible and the tracking information SVI is not generated.

The tracking information SVI can preferably be used in the traffic control center or the central monitoring entity ZÜS to broadcast traffic messages or can be used for cooperative ITS traffic systems or traffic telematics systems.

Proceeding from the ITS scenario illustrated in FIG. 1, FIG. 3 shows a second expanded cooperative ITS scenario for tracking at least one vehicle from a multiplicity of vehicles FZ4 . . . FZ10 moving on the road or the freeway VKS, in which a statement for tracking is obtained in a local unit.

In contrast to the scenario according to FIG. 2, seven vehicles—a fourth vehicle FZ4, a fifth vehicle FZ5, a sixth vehicle FZ6, a seventh vehicle FZ7, an eighth vehicle FZ8, a ninth vehicle FZ9 and a tenth vehicle FZ10—which are buses or automobiles, for example, according to FIG. 3, but any other vehicle type, for example truck, motorcycle, bicycle, etc. would also again be possible, are moving at a different speed on the road or the freeway VKS in the direction of movement BWR in this second expanded cooperative scenario. In this case, vehicle convoys having a sometimes different number of automobiles and buses in each vehicle convoy respectively drive past a stationary modified road device SV in the form of a modified "roadside unit" RSU at times t1, t2, t3. A first vehicle convoy comprising three automobiles and one bus, the bus FZ4 and the automobiles FZ5, FZ6, FZ7, therefore again passes the first modified "roadside unit" RSU1 at the time t1, a second vehicle convoy comprising three automobiles, the automobiles FZ6, FZ7, FZ8, again passes the second modified "roadside unit" RSU2 at the time t2, and a third vehicle convoy comprising three automobiles and one bus, the bus FZ9 and the automobiles FZ6, FZ7, FZ10, passes a third modified "roadside unit" RSU3 at the time t3. The road device SV or the "roadside unit" RSU1, RSU2, RSU3 can again be any desired technical system which belongs to the traffic infrastructure, controls the traffic and/or provides information on the traffic and/or an electronic device which is configured for this purpose and is preferably capable of V2X communication, as already mentioned above. The road devices SV or the "roadside units" RSU1, RSU2, RSU3 are passed by the three vehicle convoys in this case along a second tracking route SVS2 of the road VKS.

The second tracking route SVS2 is also, at the same time, a capture route because each vehicle FZ4 . . . FZ10 in the three vehicle convoys preferably transmits or emits an item of information $IF_{FZ4}$ . . . $IF_{FZ10}$ corresponding to the vehicle at regular intervals of time, for example every 100 ms, via a radio signal which needs to be captured. For this purpose, each vehicle FZ4 . . . FZ10 has an information transmitting device $ISE_{FZ4}$ . . . $ISE_{FZ10}$ corresponding to the vehicle which is preferably in the form of the V2X communication unit and is also again integrated in the on-board electronics of the vehicle (for example if the vehicle is a "non-legacy vehicle") or else is in the form of a vehicle-independent separate device (for example if the vehicle is a "legacy vehicle"). Each item of information of this information $IF_{FZ4}$ . . . $IF_{FZ10}$ corresponding to the vehicle contains a multiplicity of parameter data $PD_{FZ4}$ . . . $PD_{FZ10}$ which accordingly correspond to the vehicle and belong to information parameters according to the following tables for FIG. 3 (Table-1-FIG. 3 to Table-7-FIG. 3).

Table-1-FIG. 3 shows the information $IF_{FZ4}$ emitted by the vehicle FZ4 with the associated parameter data $PD_{FZ4}$, Table-2-FIG. 3 shows the information $IF_{FZ5}$ emitted by the vehicle FZ5 with the associated parameter data $PD_{FZ5}$, Table-3-FIG. 3 shows the information $IF_{FZ6}$ emitted by the vehicle FZ6 with the associated parameter data $PD_{FZ6}$, Table-4-FIG. 3 shows the information $IF_{FZ7}$ emitted by the vehicle FZ7 with the associated parameter data $PD_{FZ7}$, Table-5-FIG. 3 shows the information $IF_{FZ5}$ emitted by the vehicle FZ8 with the associated parameter data $PD_{FZ8}$, Table-6-FIG. 3 shows the information $IF_{FZ9}$ emitted by the vehicle FZ9 with the associated parameter data $PD_{FZ9}$, and Table-7-FIG. 3 shows the information $IF_{FZ10}$ emitted by the vehicle FZ10 with the associated parameter data $PD_{FZ10}$.

TABLE 1

FIG. 3

| Information ($IF_{FZ4}$) emitted by the vehicle (FZ4) with data relating to information parameters ($PD_{FZ4}$) | Information ($IF_{FZ4, t1}$, $IF_{FZ4, t2}$, $IF_{FZ4, t3}$) emitted at times (t1, t2, t3) with parameter data ($PD_{FZ4, t1}$, $PD_{FZ4, t2}$, $PD_{FZ4, t3}$) t1 | t2 | t3 |
|---|---|---|---|
| (Pseudonymous) identifier ID | = 100555 | | |
| (Pseudonymous) information certificate ID | = Kv87xc34 | | |
| Certificate authority | = certauth212 | | |
| Position (WGS84) | = Lat: XX.xxx(t1)/ Lon: YY.yyy(t1) | | |
| Time stamp | = dd.MM.yyyy(t1)/ HH:mm:ss(t1) | | |
| Type | = Bus | | |
| Direction of travel | = west | | |
| Speed | = 120 km/h | | |
| Length | = 7.20 m | | |
| Width | = 2.35 m | | |
| Optional parameters | = . . . | | |

TABLE 2

FIG. 3

| Information ($IF_{FZ5}$) emitted by the vehicle (FZ5) with data relating to information parameters ($PD_{FZ5}$) | Information ($IF_{FZ5, t1}$, $IF_{FZ5, t2}$, $IF_{FZ5, t3}$) emitted at times (t1, t2, t3) with parameter data ($PD_{FZ5, t1}$, $PD_{FZ5, t2}$, $PD_{FZ5, t3}$) t1 | t2 | t3 |
|---|---|---|---|
| (Pseudonymous) identifier ID | = 15060607 | | |
| (Pseudonymous) information certificate ID | = Fr94Le97 | | |
| Certificate authority | = certauth358 | | |
| Position (WGS84) | = Lat: XX.xxx(t1)/ Lon: YY.yyy(t1) | | |
| Time stamp | = dd.MM.yyyy(t1)/ HH:mm:ss(t1) | | |
| Type | = Automobile | | |
| Direction of travel | = west | | |
| Speed | = 124 km/h | | |
| Length | = 3.55 m | | |
| Width | = 1.90 m | | |
| Optional parameters | = . . . | | |

TABLE 3

FIG. 3

| Information ($IF_{FZ6}$) emitted by the vehicle (FZ6) with data relating to information parameters ($PD_{FZ6}$) | Information ($IF_{FZ6, t1}$, $IF_{FZ6, t2}$, $IF_{FZ6, t3}$) emitted at times (t1, t2, t3) with parameter data ($PD_{FZ6, t1}$, $PD_{FZ6, t2}$, $PD_{FZ6, t3}$) t1 | t2 | t3 |
|---|---|---|---|
| (Pseudonymous) identifier ID | = 477300 | = 13579 | = 13579 |
| (Pseudonymous) information certificate ID | = 6p248 | = 7my035 | = 7my035 |

TABLE 3-continued

FIG. 3

| Information ($IF_{FZ6}$) emitted by the vehicle (FZ6) with data relating to information parameters ($PD_{FZ6}$) | Information ($IF_{FZ6,\,t1}$, $IF_{FZ6,\,t2}$, $IF_{FZ6,\,t3}$) emitted at times (t1, t2, t3) with parameter data ($PD_{FZ6,\,t1}$, $PD_{FZ6,\,t2}$, $PD_{FZ6,\,t3}$) | | |
|---|---|---|---|
| | t1 | t2 | t3 |
| Certificate authority | = eurp4711 | = eurp4711 | = eurp4711 |
| Position (WGS84) | = Lat: XX.xxx(t1)/ Lon: YY.yyy(t1) | = Lat: XX.xxx(t2)/ Lon: YY.yyy(t2) | = Lat: XX.xxx(t3)/ Lon: YY.yyy(t3) |
| Time stamp | = dd.MM.yyyy(t1)/ HH:mm:ss(t1) | = dd.MM.yyyy(t2)/ HH:mm:ss(t2) | = dd.MM.yyyy(t3)/ HH:mm:ss(t3) |
| Type | = Automobile | = Automobile | = Automobile |
| Direction of travel | = west | = west | = west |
| Speed | = 150 km/h | = 165 km/h | = 148 km/h |
| Length | = 4.10 m | = 4.10 m | = 4.10 m |
| Width | = 2.05 m | = 2.05 m | = 2.05 m |
| Optional parameters | = . . . | = . . . | = . . . |

TABLE 4

FIG. 3

| Information ($IF_{FZ7}$) emitted by the vehicle (FZ7) with data relating to information parameters ($PD_{FZ7}$) | Information ($IF_{FZ7,\,t1}$, $IF_{FZ7,\,t2}$, $IF_{FZ7,\,t3}$) emitted at times (t1, t2, t3) with parameter data ($PD_{FZ7,\,t1}$, $PD_{FZ7,\,t2}$, $PD_{FZ7,\,t3}$) | | |
|---|---|---|---|
| | t1 | t2 | t3 |
| (Pseudonymous) identifier ID | = 94633 | = 382323 | = 998111 |
| (Pseudonymous) information certificate ID | = QK92 | = I85r3 | = 2m1073 |
| Certificate authority | = eurp2700 | = eurp2700 | = eurp2700 |
| Position (WGS84) | = Lat: XX.xxx(t1)/ Lon: YY.yyy(t1) | = Lat: XX.xxx(t2)/ Lon: YY.yyy(t2) | = Lat: XX.xxx(t3)/ Lon: YY.yyy(t3) |
| Time stamp | = dd.MM.yyyy(t1)/ HH:mm:ss(t1) | = dd.MM.yyyy(t2)/ HH:mm:ss(t2) | = dd.MM.yyyy(t3)/ HH:mm:ss(t3) |
| Type | = Automobile | = Automobile | = Automobile |
| Direction of travel | = west | = west | = west |
| Speed | = 153 km/h | = 168 km/h | = 153 km/h |
| Length | = 4.40 m | = 4.40 m | = 4.40 m |
| Width | = 2.15 m | = 2.15 m | = 2.15 m |
| Optional parameters | = . . . | = . . . | = . . . |

TABLE 5

FIG. 3

| Information ($IF_{FZ8}$) emitted by the vehicle (FZ8) with data relating to information parameters ($PD_{FZ8}$) | Information ($IF_{FZ8,\,t1}$, $IF_{FZ8,\,t2}$, $IF_{FZ8,\,t3}$) emitted at times (t1, t2, t3) with parameter data ($PD_{FZ8,\,t1}$, $PD_{FZ8,\,t2}$, $PD_{FZ8,\,t3}$) | | |
|---|---|---|---|
| | t1 | t2 | t3 |
| (Pseudonymous) identifier ID | | = 28112203 | |
| (Pseudonymous) information certificate ID | | = Ho57Mo61 | |
| Certificate authority | | = certauth358 | |
| Position (WGS84) | | = Lat: XX.xxx(t2)/ Lon: YY.yyy(t2) | |
| Time stamp | | = dd.MM.yyyy(t2)/ HH:mm:ss(t2) | |
| Type | | = Automobile | |
| Direction of travel | | = west | |
| Speed | | = 126 km/h | |
| Length | | = 3.70 m | |
| Width | | = 1.95 m | |
| Optional parameters | | = . . . | |

TABLE 6

FIG. 3

| Information ($IF_{FZ9}$) emitted by the vehicle (FZ9) with data relating to information parameters ($PD_{FZ9}$) | Information ($IF_{FZ9,\,t1}$, $IF_{FZ9,\,t2}$, $IF_{FZ9,\,t3}$) emitted at times (t1, t2, t3) with parameter data ($PD_{FZ9,\,t1}$, $PD_{FZ9,\,t2}$, $PD_{FZ9,\,t3}$) | | |
|---|---|---|---|
| | t1 | t2 | t3 |
| (Pseudonymous) identifier ID | | | = 70608090 |
| (Pseudonymous) information certificate ID | | | = Jw65yd23 |
| Certificate authority | | | = certauth321 |
| Position (WGS84) | | | = Lat: XX.xxx(t3)/ Lon: YY.yyy(t3) |
| Time stamp | | | = dd.MM.yyyy(t3)/ HH:mm:ss(t3) |
| Type | | | = Bus |
| Direction of travel | | | = west |
| Speed | | | = 118 km/h |
| Length | | | = 7.50 m |
| Width | | | = 2.30 m |
| Optional parameters | | | = . . . |

TABLE 7

FIG. 3

| Information ($IF_{FZ10}$) emitted by the vehicle (FZ10) with data relating to information parameters ($PD_{FZ10}$) | Information ($IF_{FZ10,\ t1}$, $IF_{FZ10,\ t2}$, $IF_{FZ10,\ t3}$) emitted at times (t1, t2, t3) with parameter data ($PD_{FZ10,\ t1}$, $PD_{FZ10,\ t2}$, $PD_{FZ10,\ t3}$) t1 | t2 | t3 |
|---|---|---|---|
| (Pseudonymous) identifier ID | | | = 542684 |
| (Pseudonymous) information certificate ID | | | = Hw57Sie86 |
| Certificate authority | | | = eurp46668 |
| Position (WGS84) | | | = Lat: XX.xxx(t3)/ Lon: YY.yyy(t3) |
| Time stamp | | | = dd.MM.yyyy(t3)/ HH:mm:ss(t3) |
| Type | | | = Automobile |
| Direction of travel | | | = west |
| Speed | | | = 122 km/h |
| Length | | | = 3.45 m |
| Width | | | = 1.90 m |
| Optional parameters | | | = . . . |

In the case of the information parameters contained in the tables and the parameter data $PD_{FZ4}$ . . . $PD_{FZ10}$ corresponding to the vehicle, a distinction is again made between (i) information parameters and associated parameter data $PD_{FZ4}$ . . . $PD_{FZ10}$ which are used to uniquely identify the respective information transmitting device $ISE_{FZ4}$ . . . $ISE_{FZ10}$ corresponding to the vehicle as the transmission source of the information $IF_{FZ4}$ . . . $IF_{FZ10}$ and therefore ultimately also the respective vehicle FZ4 . . . FZ10 and the data values of which, as already stated above, are continuously changed at regular intervals of time (for example in the region of approximately 1 minute) for anonymization purposes—these information parameters and parameter data $PD_{FZ4}$ . . . $PD_{FZ10}$ are referred to below as object-identifying information parameters and parameter data $PD_{FZ4}$ . . . $PD_{FZ10}$—and (ii) information parameters and associated parameter data $PD_{FZ4}$ . . . $PD_{FZ10}$ which are used to characterize, indicate, type, etc., but not uniquely identify, the respective vehicle FZ4 . . . FZ10 in which the information transmitting device $ISE_{FZ4}$ . . . $ISE_{FZ10}$ corresponding to the vehicle is situated as the transmission source of the information $IF_{FZ4}$ . . . $IF_{FZ10}$ and the data values of which are not changed—these information parameters and parameter data $PD_{FZ4}$ . . . $PD_{FZ10}$ are referred to below as non-object-identifying information parameters and parameter data $PD_{FZ4}$ . . . $PD_{FZ10}$.

In said tables, Table-1-FIG. 3 to Table-7-FIG. 3, the object-identifying information parameters and parameter data $PD_{FZ4}$ . . . $PD_{FZ10}$ are again indicated with gray shading, whereas the non-object-identifying information parameters and parameter data $PD_{FZ4}$ . . . $PD_{FZ10}$ again do not have any background shading (for example with respect to a gray scale and/or pattern) (white background in said tables). Said tables each illustrate how the object-identifying parameter data $PD_{FZ4}$ . . . $PD_{FZ10}$ at the respective times t2, t3 have changed in comparison with the object-identifying parameter data $PD_{FZ4}$ . . . $PD_{FZ10}$ at the time t1.

The number of information parameters (both with respect to the object-identifying parameters and with respect to the non-object-identifying parameters) respectively contained in the table is fundamentally open and can be increased or decreased in an arbitrary manner again as required. In the present case, the parameters decisive for the exemplary embodiment are stated. The meaning of these stated parameters and their data values are again generally known and therefore do not require any further explanation at this point. When selecting the parameters, it should again be taken into account (criteria catalog) that, for example, preferably

- different vehicle types of the road users, for example bus, automobile, motorcycle, etc., are captured;
- the time stamp of the captured vehicles belonging to the road users should be as close as possible in terms of time;
- the position of the captured different vehicles belonging to the road users should be as adjacent as possible;
- the direction of the captured vehicles belonging to the road users should be as identical as possible;
- the speed of the captured vehicles belonging to the road users should be as comparable as possible;
- the length of the captured different vehicles belonging to the road users should be used as a (group) identifying feature;
- the width of different vehicles belonging to the road users should be used as a (group) identifying feature;
- the issuing authority of the cryptographic certificates is used for the signature of the status messages;
- certificate hierarchy for validating the certificate is used for the signature of the status messages;
- repetition rate of the change of the parameters is used.

If the vehicles FZ4, FZ5, FZ6, FZ7 in the first vehicle convoy having the information transmitting devices $ISE_{FZ4}$, $ISE_{FZ5}$, $ISE_{FZ6}$, $ISE_{FZ7}$ corresponding to the vehicle and emitting the information $IF_{FZ4}$, $IF_{FZ5}$, $IF_{FZ6}$, $IF_{FZ7}$ corresponding to the vehicle are in the first information capture region IEB1 of the first information capture device IEE1 of the modified first "roadside unit" RSU1, information $IF_{FZ4,t1}$, $IF_{FZ5,t1}$, $IF_{FZ6,t1}$, $IF_{FZ7,t1}$ emitted by the information transmitting devices $ISE_{FZ4}$, $ISE_{FZ5}$, $ISE_{FZ6}$, $ISE_{FZ7}$ of the vehicles FZ4, FZ5, FZ6, FZ7 at the time t1 is captured by the first information capture device IEE1 with parameter data $PD_{FZ4,t1}$, $PD_{FZ5,t1}$, $PD_{FZ6,t1}$, $PD_{FZ7,t1}$. In a similar manner to the information capture region IEB in FIG. 1, the first information capture region IEB1 again reaches its maximum extent when the information $IF_{FZ4}$, $IF_{FZ5}$, $IF_{FZ6}$, $IF_{FZ7}$ emitted by the information transmitting device $ISE_{FZ4}$, $ISE_{FZ5}$, $ISE_{FZ6}$, $ISE_{FZ7}$ can no longer be received by the first information capture device IEE1.

In order to also be able to now again track at least one vehicle in the first vehicle convoy FZ4, FZ5, FZ6, FZ7 in the second expanded cooperative ITS scenario, in contrast to the cooperative ITS scenario explained above on the basis of FIG. 1, the first information IF1 with the first parameter data PD1 from the maximum quantity of information predefined at the time t1 by the information $IF_{FZ4,t1}$, $IF_{FZ5,t1}$, $IF_{FZ6,t1}$, $IF_{FZ7,t1}$ with the parameter data $PD_{FZ4,t1}$, $PD_{FZ5,t1}$, $PD_{FZ6,t1}$, $PD_{FL7,t1}$ is captured from a first group GR1 of the vehicles FZ6, FZ7 in the first vehicle convoy FZ4, FZ5, FZ6, FZ7, which comprises at least one vehicle, but preferably a plurality of vehicles with the proviso "The greater the number of groups, the easier the correlation of the different parameter data from the information capture region". When taking into account or stipulating the number of vehicles in the first group GR1, the criteria catalog mentioned above should be used when selecting the parameters.

In the present case, at the time t1 according to FIG. 3, the two vehicles FZ6, FZ7 form the first group GR1 because, even though the vehicle type is also the same here contrary to the criteria catalog, for example, the speed of said vehicles is comparable and the prerequisite that the time stamps of said vehicles are close in terms of time and the position of the captured vehicles is adjacent is present (as illustrated in principle in FIG. 3). The information $IF_{FZ6,t1}$, $IF_{FZ7,t1}$ emitted by the vehicles FZ6, FZ7 at the time t1 with the parameter data $PD_{FZ6,t1}$, $PD_{FZ7,t1}$ is the first information IF1 with the first parameter data PD1 as a result of the capture affiliation of said vehicles to the first group GR1 at the time t1.

For the further performance of the tracking, the first information capture device IEE1 is now again designed, preferably using generally conventional data processing means (for example a hardware unit based on a microprocessor and a memory component and program modules which can be operated and executed as software on the hardware unit), in such a manner that the data profile $DP_{GR1}$ specific to the first group, in particular the group footprint or the group stamp of the vehicle group, is again generated from the captured first parameter data PD1.

This data profile $DP_{GR1}$ specific to the first group is then again forwarded in the modified first "roadside unit" RSU1 from the first information capture device IEE1 to the first communication interface KSS1 which is connected to the first information capture device IEE1 and provides the data profile $DP_{GR1}$ specific to the first group and received from the first information capture device IEE1 for data evaluation based on a similarity comparison of data profiles. How, when and where this data profile similarity comparison takes place is explained further below in connection with the description of FIG. 3.

In the interim, while the first data profile is generated and forwarded as described, the first vehicle convoy FZ4, FZ5, FZ6, FZ7 moves further along the second tracking route SVS2 on the road or the freeway VKS. Since the vehicles FZ4, FZ5, FZ6, FZ7 in the convoy are moving at a different speed, however, the first vehicle convoy will come apart along the second tracking route SVS2 and will be reduced to the vehicles at a comparable speed. These are the vehicles FZ6, FZ7 which, as a sub-convoy of the first vehicle convoy, form the first group GR1. It can therefore be assumed that, if one of these vehicles does not leave the road or the freeway VKS—for example for a stop at a gas station or a rest area or else to continue the journey on another road—or one of the vehicles does not inevitably leave the convoy as a result of a vehicle defect, for example engine damage, and does not drive at the edge of the road (on the shoulder in the case of the freeway) and stop, the vehicle sub-convoy is also still moving together on the road or the freeway VKS along the second tracking route SVS2.

In the second expanded cooperative ITS scenario illustrated in FIG. 3, in addition to the capture time t1, there is also at least one further time or a further point, the capture time t2 with the modified second "roadside unit" RSU2 and the capture time t3 with the modified second "roadside unit" RSU3, for tracking the at least one vehicle in the vehicle sub-convoy FZ6, FZ7 along the second tracking route SVS2.

If the sub-convoy with the vehicles FZ6, FZ7 now approaches the second "roadside unit" RSU2 and if, in addition to the two vehicles FZ6, FZ7 mentioned, also the vehicle FZ8 having the information transmitting devices $ISE_{FZ6}$, $ISE_{FZ7}$, $ISE_{FZ8}$ corresponding to the vehicle and emitting the information $IF_{FZ6}$, $IF_{FZ7}$, $IF_{FZ5}$ corresponding to the vehicle are finally in the second information capture region IEB2 of the second information capture device IEE2 of the second "roadside unit" RSU2 for the second vehicle convoy, information $IF_{FZ6,t2}$, $IF_{FZ7,t2}$, $IF_{FZ8,t2}$ emitted by the information transmitting devices $ISE_{FZ6}$, $ISE_{FZ7}$, $ISE_{FZ8}$ of the vehicles FZ6, FZ7, FZ8 at the time t2 is captured by the second information capture device IEE2 with parameter data $PD_{FZ6,t2}$, $PD_{FZ7,t2}$, $PD_{FZ8,t2}$. The "roadside units" RSU1, RSU2 with the two information capture regions IEB1, IEB2 are again arranged in a manner separated from one another by an arbitrarily selectable distance. In a similar manner to the information capture region IEB in FIG. 1 and the first information capture region IEB1, the second information capture region IEB2 also again reaches its maximum extent when the information $IF_{FZ6}$, $IF_{FZ7}$, $IF_{FZ8}$ emitted by the information transmitting device $ISE_{FZ6}$, $ISE_{FZ7}$, $ISE_{FZ8}$ can no longer be received by the second information capture device IEE2.

Like the first information capture device IEE1, the second information capture device IEE2 again captures second information IF2 with second parameter data PD2 from the maximum quantity of information predefined at the time t2 by the information $IF_{FZ6,t2}$, $IF_{FZ7,t2}$, $IF_{FZ8,t2}$ with the parameter data $PD_{FZ6,t2}$, $PD_{FZ7,t2}$, $PD_{FZ8}$,t2 from a second group GR2 of the vehicles FZ6, FZ7 in the second vehicle convoy FZ6, FZ7, FZ8, which again comprises at least one vehicle, but preferably again a plurality of vehicles with the proviso "The greater the number of groups, the easier the correlation of the different parameter data from the information capture region", at regular intervals of time or for a calculated time window—for example by means of the calculation according to the formula s=v*t (distance equals speed times time), where s=distance between RSU1 and RSU2 and v=speed of the vehicle convoy according to the tables (cf. Table-1-FIG. 3 to Table-7-FIG. 3), the time t and by considering "±t" to be the time window—after capturing the first vehicle group GR1 in the first information capture region IEB1 for each interval of time or for each time window. When taking into account or stipulating the number of vehicles in the second group GR2, said criteria catalog should again be used when selecting the parameters.

In the present case, at the time t2 according to FIG. 3, the two vehicles FZ6, FZ7 also form the second group GR2 because, even though the vehicle type is the same contrary to the criteria catalog, for example, the speed of said vehicles is comparable and the prerequisite that the time stamps of said vehicles are close in terms of time and the position of the captured vehicles is adjacent is present (as illustrated in principle in FIG. 3). The information $IF_{FZ6,t2}$, $IF_{FZ7,t2}$ emitted by the vehicles FZ6, FZ7 at the time t2 with the parameter data $PD_{FZ6,t2}$, $PD_{FZ7,t2}$ is the second information IF2 with the second parameter data PD2 as a result of the capture affiliation of said vehicles to the second group GR2 at the time t2.

During the further performance of the tracking, the second information capture device IEE2—like the first information capture device IEE1—is again designed, preferably again using generally conventional data processing means (for example a hardware unit based on a microprocessor and a memory component and program modules which can be operated and executed as software on the hardware unit), in such a manner that the data profile $DP_{GR2}$ specific to the second group, in particular the group footprint or the group stamp of the vehicle group, is generated from the captured second parameter data PD2.

This data profile $DP_{GR2}$ specific to the second group is then again forwarded in the modified second "roadside unit" RSU2 from the second information capture device IEE2 to the second communication interface KSS2 which is connected to the second information capture device IEE2 and provides the data profile $DP_{GR2}$ specific to the second group and received from the second information capture device IEE2 for data evaluation based on a similarity comparison of data profiles.

With respect to the expanded cooperative ITS scenario, illustrated in FIG. 3, for tracking the at least one vehicle in the vehicle sub-convoy FZ6, FZ7 along the second tracking route SVS2, there is now also the capture time t3 with the modified second "roadside unit" RSU3.

If the sub-convoy having the vehicles FZ6, FZ7 now approaches the third "roadside unit" RSU3 and if, in addition to these two vehicles FZ6, FZ7, also the vehicles FZ9, FZ10 having the information transmitting devices $ISE_{FZ6}$, $ISE_{FZ7}$, $ISE_{FZ9}$, $ISE_{FZ10}$ corresponding to the vehicle and emitting the information $IF_{FZ6}$, $IF_{FZ7}$, $IF_{FZ9}$, $IF_{FZ10}$ corresponding to the vehicle are finally in a third information capture region IEB3 of a third information capture device IEE3 of the third "roadside unit" RSU3 for the third vehicle convoy, information $IF_{FZ6,t3}$, $IF_{FZ7,t3}$, $IF_{FZ9,t3}$, $IF_{FZ10,t3}$ emitted by the information transmitting devices $ISE_{FZ6}$, $ISE_{FZ7}$, $ISE_{FZ9}$, $ISE_{FZ10}$ of the vehicles FZ6, FZ7, FZ9, FZ10 at the time t3 is captured by the third information capture device IEE3 with parameter data $PD_{FZ6,t3}$, $PD_{FZ7,t3}$, $PD_{FZ9,t3}$, $PD_{FZ10,t3}$.

Since the vehicle tracking is based on a similarity comparison and the data captured at two measurement points are always compared with one another for this purpose, the third information capture region IEB3 with the third information capture device IEE3 with respect to this comparison is a further second information capture region IEB2 with a further second information capture device IEE2 which captures further second information IF2 with further second parameter data PD2 for a further second group GR2 of vehicles. Against this background, the following statements which relate to the capture of information at the third time t3 should be categorized.

The "roadside units" RSU1, RSU2, RSU3 with the respective two information capture regions IEB1, IEB2 are again arranged in a manner separated from one another by an arbitrarily selectable distance. In a similar manner to the information capture region IEB in FIG. 1, the first information capture region IEB1 and the second information capture region IEB2, the further second information capture region IEB2 (IEB3) again also reaches its maximum extent when the information $IF_{FZ6}$, $IF_{FZ7}$, $IF_{FZ9}$, $IF_{FZ10}$ emitted by the information transmitting device $ISE_{FZ6}$, $ISE_{FZ7}$, $ISE_{FZ9}$, $ISE_{FZ10}$ can no longer be received by the further second information capture device IEE2 (IEE3).

Like the first information capture device IEE1 and the second information capture device IEE2, the further second information capture device IEE2 again captures further second information IF2 with further second parameter data PD2 from the maximum quantity of information predefined at the time t3 by the information $IF_{FZ6,t3}$, $IF_{FZ7,t3}$, $IF_{FZ10,t3}$, $IF_{FZ9,t3}$ with the parameter data $PD_{FZ6,t3}$, $PD_{FZ7,t3}$, $PD_{FZ9,t3}$, $PD_{FZ10,t3}$ from a further second group GR2 of the vehicles FZ6, FZ7 in the third vehicle convoy FZ6, FZ7, FZ9, FZ10, which again comprises at least one vehicle, but preferably again a plurality of vehicles with the proviso "The greater the number of groups, the easier the correlation of the different parameter data from the information capture region", at regular intervals of time or for a calculated time window—for example by means of the calculation according to the formula s=v*t (distance equals speed times time), where s=distance between RSU1 and RSU2 and v=speed of the vehicle convoy according to the tables (cf. Table-1-FIG. 3 to Table-7-FIG. 3), the time t and by considering "±t" to be the time window—after capturing the first vehicle group GR1 in the first information capture region IEB1 for each interval of time or for each time window. When taking into account or stipulating the number of vehicles in the further second group GR2, said criteria catalog should again be used when selecting the parameters.

In the present case, at the time t3 according to FIG. 3, the two vehicles FZ6, FZ7 also form the further second group GR2 because, even though the vehicle type is the same contrary to the criteria catalog, for example, the speed of said vehicles is still comparable and the prerequisite that the time stamps of said vehicles are close in terms of time and the position of the captured vehicles is adjacent is present (as illustrated in principle in FIG. 3). The information $IF_{FZ6,t3}$, $IF_{FZ7,t3}$ emitted by the vehicles FZ6, FZ7 at the time t3 with the parameter data $PD_{FZ6,t3}$, $PD_{FZ7,t3}$ is the further second information IF2 with the further second parameter data PD2 as a result of the capture affiliation of said vehicles to the further second group GR2 at the time t3.

During the further performance of the tracking, the further second information capture device IEE2—like the first information capture device IEE1 and the second information capture device IEE2—is also again designed, preferably again using generally conventional data processing means (for example a hardware unit based on a microprocessor and a memory component and program modules which can be operated and executed as software on the hardware unit), in such a manner that the further data profile $DP_{GR2}$ specific to the second group, in particular the group footprint or the group stamp of the vehicle group, is generated from the captured further second parameter data PD2.

This further data profile $DP_{GR2}$ specific to the second group is then again forwarded in the modified third "roadside unit" RSU3 from the further second information capture device IEE2 to a third communication interface KSS3 which, by definition, is a further second communication interface KSS2 which is connected to the further second information capture device IEE2 and provides the further data profile $DP_G$R2 specific to the second group and received from the further second information capture device IEE2 for data evaluation based on a similarity comparison of data profiles.

Before it is now stated what happens then with the two data profiles $DP_{GR2}$, $DP_{GR1}$, it is noted at this point that, as an alternative to the second information capture region IEB2 described above at the time t2, the further second information capture region IEB3 at the time t3, with the modifications described above, can be used to generate the data profile $DP_G$R2 specific to the second group.

In addition, it is also possible (in a modification of the previous description in which the first information capture region IEB1 is present at the time t1 and the second information capture region IEB2 is present at the time t2) for the first information capture region IEB1 to be used at the time t2 to generate the data profile $DP_{GR1}$ specific to the first group and for the second information capture region IEB2 to be used at the time t3 to generate the data profile $DP_{GR2}$ specific to the second group with the corresponding modifications resulting from FIG. 3.

Irrespective of what is captured at what time, there are now two comparable variables, the two data profiles $DP_{GR1}$, $DP_{GR2}$, for the data profile similarity comparison discussed. If this data profile similarity comparison is now intended to be carried out in a decentralized manner, that is to say locally, in contrast to the situation according to FIG. 2, there are two options provided that a central unit in the form of an evaluation device AWE is included in the first "roadside unit" RSU1, in the second "roadside unit" RSU2 and in the third "roadside unit" RSU3 for the data profile similarity comparison to be carried out.

One option is for the first data profile $DP_{GR1}$ to be transmitted, via the first communication interface KSS1 in the first "roadside unit" RSU1, to the second communication interface KSS2 in the second "roadside unit" RSU2 or to the further second communication interface KSS2 in the third "roadside unit" RSU3 by means of a wireless or wired connection, for example, and for the second communication interface KSS2 in the second "roadside unit" RSU2 to then supply the two data profiles $DP_{GR1}$, $DP_{GR2}$ to the evaluation device AWE in the second "roadside unit" RSU2 for the data profile similarity comparison to be carried out or else for the further second communication interface KSS2 in the third "roadside unit" RSU3 to then supply the two data profiles $DP_{GR1}$, $DP_{GR2}$ to the evaluation device AWE in the third "roadside unit" RSU3 for the data profile similarity comparison to be carried out.

The other option is for the second data profile $DP_{GR2}$ to be transmitted, via the second communication interface KSS2 in the second "roadside unit" RSU2, or else for the further second data profile $DP_{GR2}$ to be transmitted, via the further second communication interface KSS2 in the third "roadside unit" RSU3, to the first communication interface KSS1 in the first "roadside unit" RSU1 in each case via a wireless or wired connection, for example, and for the first communication interface KSS1 to then supply the two data profiles $DP_{GR1}$, $DP_{GR2}$ to the evaluation device AWE in the first "roadside unit" RSU1 for the data profile similarity comparison to be carried out.

Irrespective of which option ultimately takes effect, the evaluation device AWE is again designed, preferably again using generally conventional means for the data-processing-based comparison of two variables (for example a hardware unit based on a microprocessor and a memory component and program modules which can be operated and executed as software on the hardware unit), for carrying out the data profile similarity comparison in such a manner that the provided data profile $DP_{GR2}$ specific to the second group is compared with the provided data profile $DP_{GR1}$ specific to the first group using parameter data, in particular from a combination of the parameter data PD1, PD2 within the groups GR1, GR2.

If the data profile similarity comparison carried out in the evaluation device AWE again reveals that the correlation between the first parameter data PD1 and the second parameter data PD2 is so great that the parameter data PD1, PD2 at least partially correspond, a statement can be made on the successful tracking of the vehicles FZ1, FZ2, FZ3 captured in the first group GR1 along the first tracking route SVS1 between the two information capture regions IEB1, IEB2. In this case, the respective evaluation device AWE in the first "roadside unit" RSU1, in the second "roadside unit" RSU2 or in the third "roadside unit" RSU3 produces or generates the tracking information SVI and forwards this information to the central monitoring entity ZÜS which is preferably in the form of a traffic control center and to which the evaluation device AWE is connected, for example in a wireless or wired manner. Otherwise, if the correspondence between the parameter data PD1, PD2 is not so great, such a statement is not possible and the tracking information SVI is not generated.

The tracking information SVI can then again preferably be used in the traffic control center or the central monitoring entity ZÜS to broadcast traffic messages or can be used for cooperative ITS traffic systems or traffic telematics systems.

On the basis of the expanded cooperative ITS scenario for tracking according to FIG. 2, FIG. 4 shows the influence of dynamically changing affiliations of nine vehicles FZ01 . . . FZ09—a first vehicle FZ01, a second vehicle FZ02, a third vehicle FZ03, a fourth vehicle FZ04, a fifth vehicle FZ05, a sixth vehicle FZ06, a seventh vehicle FZ07, an eighth vehicle FZ08 and a ninth vehicle FZ09—driving on the route or the freeway VKS in the direction of movement BWR to the first group GR1 with respect to the first "roadside unit" with the first information capture region $IEB1_{RSU1}$ and to the second group GR2 with respect to the second "roadside unit" with the second information capture region $IEB2_{RSU2}$ on the similarity comparison (correlation check) to be carried out during the vehicle tracking according to FIG. 2.

With respect to the first "roadside unit" with the first information capture region $IEB1_{RSU1}$, the vehicles FZ5, FZ6, FZ8, FZ9 belong to the first group GR1 at an nth time $t_n$, the vehicles FZ2, FZ4, FZ5, FZ6, FZ7 belong to the first group GR1 at an (n+1)th time $t_{n+1}$, and the vehicles FZ1, FZ2, FZ3, FZ4 belong to the first group GR1 at an (n+2)th time $t_{n+2}$.

With respect to the second "roadside unit" with the second information capture region $IEB2_{RSU2}$, the vehicles FZ6, FZ7, FZ8 belong to the second group GR2 at an mth time $t_m$, and the vehicles FZ2, FZ4, FZ5, FZ7 belong to the second group GR2 at an (m+1)th time $t_{m+1}$.

If the correlation check between the first group GR1 and the second group GR2 is now carried out at the respective times, the following correlation values KW result:

$GR1(t_n)$=FZ5, FZ6, FZ8, FZ9
with}→KW=50%
$GR2(t_m)$=FZ6, FZ7, FZ8

$GR1(t_n)$=FZ5, FZ6, FZ8, FZ9
with}→KW=25%
$GR2(t_{m+1})$=FZ2, FZ4, FZ5, FZ7

$GR1(t_{n+1})$=FZ2, FZ4, FZ5, FZ6, FZ7
with}→KW=40%
$GR2(t_m)$=FZ6, FZ7, FZ8

$GR1(t_{n+1})$=FZ2, FZ4, FZ5, FZ6, FZ7
with}→KW=80%
$GR2(t_{m+1})$=FZ2, FZ4, FZ5, FZ7

$GR1(t_{n+2})$=FZ1, FZ2, FZ3, FZ4
with}→KW=0%
$GR2(t_m)$=FZ6, FZ7, FZ8

$GR1(t_{n+2})$=FZ1, FZ2, FZ3, FZ4
with}→KW=50%
$GR2(t_{m+1})$=FZ2, FZ4, FZ5, FZ7

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for tracking moving objects, in which a) a multiplicity of objects move in an area along a tracking route in a defined direction of movement, wherein the objects moving along the tracking route in space are vehicles, b) the objects emit information with data relating to a plurality of non-object-identifying information parameters, at regular intervals of time wherein the non-object-identifying information parameters are a type of object, length of object, and/or a width of object, and c) with respect to the objects, the information emitted is captured with the non-object-identifying parameter data repeatedly, at different locations at different times, wherein d) first information is captured with first non-object-identifying parameter data from a first group of the objects, which comprises at least one object, in a first information capture region along the tracking route and for the defined direction of movement, e) a data profile specific to the first group, including at least one of a group footprint and a group stamp of the object group, is generated from the captured first non-object-identifying parameter data, and f) the data profile specific to the first group is provided for data evaluation based on a similarity comparison of data profiles, g) second information is respectively captured with second non-object-identifying parameter data from a second group of the objects, which comprises at least one object, in at least one further, second information capture region spaced apart from the first information capture region along the tracking route at regular intervals of time or for a calculated time window after the capture in the first information capture region for the defined direction of movement for each interval of time or for each time window, h) a data profile specific to the second group is respectively generated from the respectively captured second non-object-identifying parameter data, and i) the respectively generated data profile specific to the second group is provided for the data evaluation based on the data profile similarity comparison, j) each data profile specific to the second group is compared with the data profile specific to the first group during the data evaluation using parameter data, k) if it is determined, during the data profile similarity comparison carried out in each case, that the correlation between the first non-object-identifying parameter data and the second non-object-identifying parameter data is so great that the respective parameter data at least partially correspond, a statement can be made on the successful tracking of at least some of the objects captured in the first group along the tracking route between the two information capture regions and an item of tracking information is generated that the second group comprises at least some of the objects of the first group, otherwise such a statement is not possible and the tracking information is not generated.

2. The tracking method as claimed in claim 1, wherein method steps a) to f) or method steps a) to c) and g) to i) are carried out in a first device and method steps j) and k) are carried out in a second device.

3. The tracking method as claimed in claim 1, wherein method steps a) to f) or method steps a) to c) and g) to i) and method steps j) and k) are carried out in a single device.

4. The tracking method as claimed in claim 1, wherein the information with the non-object-identifying parameter data is an intelligent transport system (ITS) status message containing data relating to a plurality of vehicle-specific, vehicle-characteristic message parameters.

5. The tracking method as claimed in claim 4, wherein the ITS status message is a “cooperative awareness message <CAM>” according to the ETSI standard “ETSI TS 102 637-2” or a “basic safety message <BSM>” according to the SAE standard “SAE J2735”.

6. The tracking method as claimed in claim 5, wherein the following vehicle-specific, vehicle-characteristic message parameters are used in the “cooperative awareness message <CAM>”:

type of different vehicles belonging to the road users, for example bus, automobile, motorcycle, etc., in the group;

time stamp of vehicles belonging to the road users in the group should be close in terms of time;

position of different vehicles belonging to the road users in the group should be adjacent;

direction of vehicles belonging to the road users in the group should be the same;

speed of vehicles belonging to the road users in the group should be comparable;

length of different vehicles belonging to the road users is used as a group identifying feature;

width of different vehicles belonging to the road users is used as a group identifying feature;

issuing authority of the cryptographic certificates for the signature of the status messages;

certificate hierarchy for validating the certificate for the signature of the status messages;

repetition rate of the change of the parameters.

7. The tracking method as claimed in claim 1, wherein the tracking information is transmitted to a central monitoring entity, and, in this respect, is used to broadcast traffic messages or is used for cooperative intelligent transport system (ITS) traffic systems or traffic telematics systems.

8. The method as claimed in claim 1, wherein the objects also emit a pseudonymous identifier ID and/or a pseudonymous information certificate ID and/or a pseudonymous certificate authority, wherein the pseudonymous identifier ID and the pseudonymous information certificate ID and the pseudonymous certificate authority change continuously at regular intervals of time.

9. An arrangement for tracking moving objects in which a) a multiplicity of objects move in an area along a tracking route in a defined direction of movement, wherein the objects moving along the tracking route in space are vehicles, b) the objects emit information with data relating to a plurality of non-object-identifying information parameters, at regular intervals of time, wherein the non-object-identifying information parameters are a type of object, length of object, and/or a width of object, wherein the arrangement comprises:

c) at least two information capture devices which capture the information emitted by the moving objects with the non-object-identifying parameter data, at different locations at different times, further wherein, the at least two information capture devices comprise:

d) a first information capture device d1) which captures first information with first non-object-identifying parameter data from a first group of the objects, which comprises at least one object in a first information capture region along the tracking route for the defined direction of movement and d2) is designed in such a manner that a data profile specific to the first group, including at least one of a group footprint or a group stamp of the object group, can be generated from the captured first non-object-identifying parameter data, e) a first communication interface which is connected to the first information capture device and provides the data profile specific to the first group and received from the first information capture device for data evaluation based on a similarity comparison of data profiles, f) at least one second information capture device f1) which respectively captures second information with second non-object-identifying parameter data from a second group of the objects, which comprises at least one object, in a further, second information capture region spaced apart from the first information capture region along the tracking route for the defined direction of movement at regular intervals of time or for a calculated time window after the capture in the first information capture region for each interval of time or for each time window, and f2) is designed in such a manner that a second data profile specific to the second group can be generated from the respectively captured second non-object-identifying parameter data, g) a second communication interface which is connected to the second information capture device and provides the data profile specific to the second group and received from the second information capture device for the data evaluation based on the data profile similarity comparison, h) an evaluation device which is connected to the first communication interface and to the second communication interface and is designed in such a manner that h1) each data profile specific to the second group and provided by the second communication device is compared with the data profile specific to the first group and provided by the first communication device using parameter data, h2) if it is determined, during the data profile similarity comparison respectively carried out, that the correlation between the first non-object-identifying parameter data and the second non-object-identifying parameter data is so great that the respective parameter data at least partially correspond, a statement can be made on the successful tracking of at least some of the objects captured in the first group along the tracking route between the two information capture regions and an item of tracking information can be generated that the second group comprises at least some of the objects of the first group, otherwise such a statement is not possible and the tracking information is not generated.

10. The tracking arrangement as claimed in claim 9, wherein arrangement features a) to e) with respect to the concrete elements stated therein or arrangement features a) to c) and f) to g) with respect to the concrete elements stated therein are contained in a first device and arrangement features h) to h2) with respect to the concrete elements stated therein are contained in a second device.

11. The tracking arrangement as claimed in claim 9, wherein arrangement features a) to e) with respect to the concrete elements stated therein or arrangement features a) to c) and f) to g) with respect to the concrete elements stated therein and arrangement features h) to h2) with respect to the concrete elements stated therein are contained in a single device.

12. The tracking arrangement as claimed in claim 9, wherein the information with the non-object-identifying parameter data is an intelligent transport system (ITS) status message containing data relating to a plurality of vehicle-specific, vehicle-characteristic message parameters.

13. The tracking arrangement as claimed in claim 12, wherein the ITS status message is a "cooperative awareness message <CAM>" according to the ETSI standard "ETSI TS 102 637-2" or a "basic safety message <BSM>" according to the SAE standard "SAE J2735".

14. The tracking arrangement as claimed in claim 13, wherein the "cooperative awareness message <CAM>" has the following vehicle-specific, vehicle-characteristic message parameters:

type of different vehicles belonging to the road users, for example bus, automobile, motorcycle, etc., in the group;

time stamp of vehicles belonging to the road users in the group should be close in terms of time;

position of different vehicles belonging to the road users in the group should be adjacent;

direction of vehicles belonging to the road users in the group should be the same;

speed of vehicles belonging to the road users in the group should be comparable;

length of different vehicles belonging to the road users is used as a group identifying feature;

width of different vehicles belonging to the road users is used as a group identifying feature;

issuing authority of the cryptographic certificates for the signature of the status messages;

certificate hierarchy for validating the certificate for the signature of the status messages;

repetition rate of the change of the parameters.

15. The tracking arrangement as claimed in claim 9, wherein for the purpose of transmitting the tracking information, the evaluation device is connected to a central monitoring entity, with the result that this can be used, as a result, to broadcast traffic messages or can be used for cooperative intelligent transport system (ITS) traffic systems or traffic telematics systems.

16. The tracking arrangement as claimed in claim 9, wherein the objects also emit a pseudonymous identifier ID and/or a pseudonymous information certificate ID and/or a pseudonymous certificate authority, wherein the pseudonymous identifier ID and the pseudonymous information certificate ID and the pseudonymous certificate authority change continuously at regular intervals of time.

17. A method for tracking moving objects, wherein the moving objects are motor vehicles driving on a road, in which information emitted by the moving objects with data relating to at least one non-object-identifying information parameter is captured at different locations at different times, wherein the non-object-identifying information parameter is a type of vehicle and a length of vehicle, wherein first information is captured with first non-object-identifying parameter data from a first group of the objects, which comprises at least one object, in a first information capture region along a tracking route and for a defined direction of movement, a data profile specific to the first group, including at least one of a group footprint and a group stamp of the object group, is generated from the captured first non-object-identifying parameter data, and the data profile specific to the first group is provided for data evaluation based on a similarity comparison of data profiles, second information is respectively captured with second non-object-identifying parameter data from a second group of the objects, which comprises at least one object, in at least one further, second information capture region spaced apart from the first information capture region along the tracking route, a data profile specific to the second group is respectively generated from the respectively captured second non-object-identifying parameter data, and the respectively generated data profile specific to the second group is provided for the data evaluation based on the data profile similarity comparison, each data profile specific to the second group is compared with the data profile specific to the first group during the data evaluation using parameter data, if it is determined, during the data profile similarity comparison carried out in each case, that the correlation between the first non-object-identifying parameter data and the second non-object-identifying parameter data is so great that the parameter data at least partially correspond, a statement can be made on the successful tracking of at least some of the objects captured in the first group along the tracking route between the two information capture regions and an item of tracking information is generated that the second group comprises at least some of the objects of the first group, otherwise such a statement is not possible and the tracking information is not generated.

18. The method as claimed in claim 17, wherein the objects also emit a pseudonymous identifier ID and/or a pseudonymous information certificate ID and/or a pseudonymous certificate authority, wherein the pseudonymous identifier ID and the pseudonymous information certificate ID and the pseudonymous certificate authority change continuously at regular intervals of time.

* * * * *